United States Patent
Liang

(10) Patent No.: US 9,069,530 B2
(45) Date of Patent: Jun. 30, 2015

(54) HINGE MECHANISM WITH EASY ASSEMBLY AND ELECTRONIC DEVICE THEREWITH

(71) Applicant: Wistron Corporation, New Taipei (TW)

(72) Inventor: Chen-Yi Liang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 136 days.

(21) Appl. No.: 13/786,486

(22) Filed: Mar. 6, 2013

(65) Prior Publication Data

US 2013/0305489 A1  Nov. 21, 2013

(30) Foreign Application Priority Data

May 17, 2012  (TW) .............................. 101117578 A

(51) Int. Cl.
- *H05K 5/00* (2006.01)
- *H05K 7/00* (2006.01)
- *G06F 1/16* (2006.01)

(52) U.S. Cl.
CPC ........... *G06F 1/1681* (2013.01); *Y10T 16/5457* (2015.01); *Y10T 16/538* (2015.01)

(58) Field of Classification Search
CPC .... G06F 1/1613; G06F 1/1615; G06F 1/1616
USPC ............. 361/679.01, 679.27, 679.26, 679.55, 361/679.56, 679.57, 679.58
See application file for complete search history.

(56) References Cited

U.S. PATENT DOCUMENTS

| | | | |
|---|---|---|---|
| 7,251,129 B2 * | 7/2007 | Lee et al. ................. | 361/679.55 |
| 7,379,292 B2 * | 5/2008 | Tsai et al. ................ | 361/679.27 |
| 7,817,408 B2 * | 10/2010 | Chiang et al. ............ | 361/679.07 |
| 8,467,184 B2 * | 6/2013 | Chen et al. ............... | 361/679.55 |
| 8,520,377 B2 * | 8/2013 | Senatori .................... | 361/679.27 |
| 8,587,938 B2 * | 11/2013 | Ahn et al. .................. | 361/679.3 |
| 2008/0184529 A1 | 8/2008 | Thom | |
| 2008/0271288 A1 * | 11/2008 | Senatori ......................... | 16/221 |

FOREIGN PATENT DOCUMENTS

CN  101675403 A  3/2010

OTHER PUBLICATIONS

Office action mailed on Mar. 4, 2015 for the Taiwan application No. 101117578, filing date: May 17, 2012, p. 2 line 2-26, p. 3-6 and p. 7 line 1.

Office action mailed on Feb. 15, 2015 for the China application No. 201210167979.2, p. 3 line 4-30 and p. 4.

\* cited by examiner

*Primary Examiner* — Anthony Haughton

(74) *Attorney, Agent, or Firm* — Winston Hsu; Scott Margo

(57) ABSTRACT

A hinge mechanism includes a sliding member, a pivoting member and a wedging member. The sliding member is disposed on a first casing in a slidable manner and includes a first bearing portion. The pivoting member is pivoted to the first casing and the second casing and includes a first pivotal portion and a second pivotal portion. The first pivotal portion is installed in first bearing portion and for driving the sliding member to slide to a first position in a first direction. The second pivot portion is installed in a second hinge of the first casing when the sliding member slides to a second position in a second position. The wedging member is disposed on the first casing in a slidable manner for wedging the sliding member when the sliding member slides to the second position.

20 Claims, 16 Drawing Sheets

HINGE MECHANISM WITH EASY ASSEMBLY AND ELECTRONIC DEVICE THEREWITH

BACKGROUND OF THE INVENTION

1. Field of the Invention

The present invention relates to a hinge mechanism and an electronic device therewith, and more particularly, to a hinge mechanism with easy assembly and an electronic device therewith.

2. Description of the Prior Art

With development of the touch panel industry, a tablet computer with a touch panel is implemented into human's daily life. A touch control instruction, such as documentation, sliding cursor, zooming in, zooming out and so on, can be performed in a manner that a finger directly touches the touch panel of the tablet computer. Recently, the tablet computer is coupled to an external keyboard, not only for providing a user with a tablet computer mode in which the touch control instruction can be performed on the touch panel, but also for providing the user with a notebook computer mode in which conventional operation of a notebook computer can be performed on the tablet computer coupled with the external keyboard. Accordingly, it enhances flexibility of the tablet computer in use.

Conventionally, a hinge mechanism is used for connecting the tablet computer and the external keyboard, so that the tablet computer achieves the aforesaid notebook computer mode by the external keyboard. However, the conventional hinge mechanism cannot be easily detached from the external keyboard, resulting in that the tablet computer mode and the notebook computer mode can not be rapidly switched, and thus it causes inconvenience in use. On the other hand, if the external keyboard is pivoted to the tablet computer in a loosely-fit manner, it is not stable for operating in use. Thus, how to design a hinge mechanism with easy assembly and stable pivoting structure becomes an issue in the field.

SUMMARY OF THE INVENTION

The present invention provides a hinge mechanism with easy assembly and an electronic device therewith for solving above drawbacks.

According to an embodiment of the present invention, a hinge mechanism for pivoting a first casing and a second casing is disclosed. The hinge mechanism includes a sliding member, a pivoting member and a wedging member. The sliding member is disposed on the first casing in a slidable manner, and the sliding member includes a first bearing portion. The pivoting member is pivoted to the first casing and the second casing, and the pivoting member includes a first pivotal portion and a second pivotal portion. The first pivotal portion is installed in the first bearing portion for sliding the sliding member to a first position in a first direction. The second pivotal portion is installed in a second bearing portion of the first casing when the sliding member is slid to a second position in a second direction opposite to the first direction. The wedging member is disposed on the first casing in a slidable manner for wedging the sliding member when the sliding member is slid to the second position, so as to fix the sliding member in the second position.

According to another embodiment of the present invention, the hinge mechanism further includes a sliding constraining structure for constraining the sliding member to slide relative to the first casing in the first direction or in the second direction.

According to another embodiment of the present invention, the sliding constraining structure includes at least one sliding slot and at least one sliding structure. The at least one sliding slot is formed on the sliding member, and the at least one sliding slot is oriented substantially parallel to the first direction and the second direction. The at least one sliding structure is disposed on the first casing in a position corresponding to the at least one sliding slot. The at least one sliding structure cooperates with the at least one sliding slot for constraining the sliding member to slide relative to the first casing in the first direction or in the second direction.

According to another embodiment of the present invention, the at least one sliding structure includes a screw post and a screw component. The screw component is disposed through the corresponding sliding slot to be screwed on the screw post, so that the sliding member slides relative to the first casing by the sliding slot cooperating with the screw component.

According to another embodiment of the present invention, the sliding constraining structure further includes at least one stopping strip abutting against a lateral side of the sliding member. The at least one stopping strip is for constraining the sliding member to slide in the first direction or in the second direction.

According to another embodiment of the present invention, the first casing includes at least one first connecting portion, and the hinge mechanism further includes at least one second connecting portion and at least one resilient member. The at least one second connecting portion is disposed on a side of the sliding member. Both ends of the at least one resilient member are respectively connected to the at least one first connecting portion and the at least one second connecting portion. The at least one resilient member is for sliding the sliding member to the second position in the second direction.

According to another embodiment of the present invention, the hinge mechanism further includes at least one constraining member disposed on the first casing and located in a position corresponding to a side of the sliding member. The at least one constraining member is for pressing the sliding member.

According to another embodiment of the present invention, at least one engaging slot is formed on the wedging member, and the hinge mechanism further includes a push button for driving the wedging member to slide relative to the first casing, and the push button includes a button body and at least one fixing structure. The button body is slidably installed on a side of the first casing. The at least one fixing structure protrudes from the button body. The at least one fixing structure is disposed through the first casing to engage with the at least one engaging slot, so that the wedging member is driven by the button body.

According to another embodiment of the present invention, the hinge mechanism further includes at least one constraining rib disposed on the first casing and located in a position corresponding to a lateral side of the wedging member. The at least one constraining rib is for constraining the wedging member to slide relative to the first casing in a third direction or in a fourth direction opposite to the third direction.

According to another embodiment of the present invention, a first constraining portion and a second constraining portion are formed on the first casing, and the hinge mechanism further includes a protruding structure and a resilient structure. The protruding structure is for selectively engaging with the first constraining portion or the second constraining portion. The resilient structure is resiliently connected to the wedging member and the protruding structure. The resilient structure drives the protruding structure to selectively engage with the first constraining portion or the second constraining portion when the wedging member slides relative to the first casing to a released position or to an engaging position.

According to another embodiment of the present invention, the hinge mechanism further includes a first wedging structure and a second wedging structure. The first wedging structure is disposed on a side of the sliding member. The second wedging structure is disposed on a side of the wedging member corresponding to the side of the sliding member. The second engaging structure engages with the first engaging structure when the sliding member slides to the second position and when the wedging member slides to the engaging position in the third direction, so as to fix the sliding member in the second position.

According to another embodiment of the present invention, the first pivotal portion is pivoted to the first bearing portion, and the second pivotal portion is pivoted to the second bearing portion.

According to another embodiment of the present invention, the hinge mechanism further includes a first torque module connected to the first pivotal portion of the pivoting member and the first bearing portion of the sliding member. The first torque module is for providing the pivoting member with a torque and includes a first engaging member and a first shaft. The first engaging member is fixed inside the first bearing portion. The first shaft includes a first shaft body, a first engaging end portion and a first rotable end portion. The first engaging end portion is connected to an end of the first shaft body, and the first engaging end portion is for engaging with the first engaging member, so as to fix the first shaft body. The first rotable end portion is connected to the other end of the first shaft body, and the first pivotal end portion rotably sheathes the first engaging end portion in a tight fit manner.

According to another embodiment of the present invention, the first torque module further includes a first sleeve is disposed inside the first pivotal portion. The first sleeve rotably sheathes the first rotable end portion in a tight fit manner, so that a friction force generates between the first sleeve and the first rotale end portion when the pivoting member rotates relative to the first shaft.

According to another embodiment of the present invention, the first engaging member includes a plurality of protrusions. The first engaging end portion includes a plurality of sunken slots corresponding to the plurality of protrusions, and the plurality of sunken slots is respectively for containing the plurality of protrusions, so as to make the first engaging end portion engage with the first engaging member.

According to another embodiment of the present invention, the hinge mechanism further includes a second torque module connected to the second pivotal portion of the pivoting member and the second bearing portion of the first casing. The second torque module is for providing the pivoting member with a torque and includes a second engaging member and a second shaft. The second engaging member is fixed inside the second bearing portion. The second shaft includes a second shaft body, a second engaging end portion and a second rotable end portion. The second engaging end portion is connected to an end of the second shaft body. The second engaging end portion is for engaging with the second engaging member, so as to fix the second shaft body. The second rotable end portion is connected to the other end of the second shaft body. The second pivotal end portion rotably sheathes the second engaging end portion in a tight fit manner.

According to another embodiment of the present invention, the second torque module further includes a second sleeve disposed inside the second pivotal portion. The second sleeve rotably sheathes the second rotable end portion in a tight fit manner, so that a friction force generates between the second sleeve and the second rotale end portion when the pivoting member rotates relative to the second shaft.

According to another embodiment of the present invention, the electronic device includes a first module, a second module and a hinge mechanism. The first module includes a first casing, and the first casing includes a second bearing portion. The second module includes a second casing. The hinge mechanism for pivoting a first casing and a second casing includes a sliding member, a pivoting member and a wedging member. The sliding member is disposed on the first casing in a slidable manner, and the sliding member includes a first bearing portion. The pivoting member is pivoted to the first casing and the second casing. The pivoting member includes a first pivotal portion and a second pivotal portion. The first pivotal portion is installed in the first bearing portion for sliding the sliding member to a first position in a first direction. The second pivotal portion is installed in a second bearing portion of the first casing when the sliding member is slid to a second position in a second direction opposite to the first direction. The wedging member is disposed on the first casing in a slidable manner for wedging the sliding member when the sliding member is slid to the second position, so as to fix the sliding member in the second position.

In summary, the present invention utilizes the first pivotal portion of the pivoting member to slide the sliding member between the first position and the second position. When the first pivotal portion of the pivoting member slides the sliding member to the first position, the second pivotal portion of the pivoting member is capable of separating from the second bearing portion of the first casing, so as to detach the first pivotal portion of the pivoting member from the first bearing portion of the sliding member. In such a manner, the first casing and the second casing of the present invention can be easily detached.

On the other hand, when the first pivotal portion of the pivoting member slides the sliding member to the first position, the second pivotal portion of the pivoting member is capable of being aligned with the second bearing portion of the first casing. Afterwards, the sliding member and the pivoting member are pushed to the second position in the second direction, so that the second pivotal portion of the pivoting member is inserted into the second bearing portion of the first casing. Accordingly, the second casing is capable of being pivoted to the first casing. Finally, the wedging member is slid to the second position for wedging the sliding member in the second position. In such a manner, the second casing can be pivoted to the first casing for easily installing the first casing and the second casing.

In addition, the hinge mechanism of the present invention can further utilize the first torque module to provide the second casing with the torque for holding the second casing at the specific angle. In other words, when the second casing pivots relative to the first casing at the specific angle, the torque provided by the first torque module can fix the second casing at the specific angle, so that the user can adjust the second casing according to preferences. In addition, when the electronic device is in use, the torque provided by the first torque module of the hinge mechanism can prevent the first casing and the second casing from vibration, so as to provide the electronic device with a good feeling of operation.

These and other objectives of the present invention will no doubt become obvious to those of ordinary skill in the art after reading the following detailed description of the embodiment that is illustrated in the various figures and drawings.

DETAILED DESCRIPTION

Figure 1:
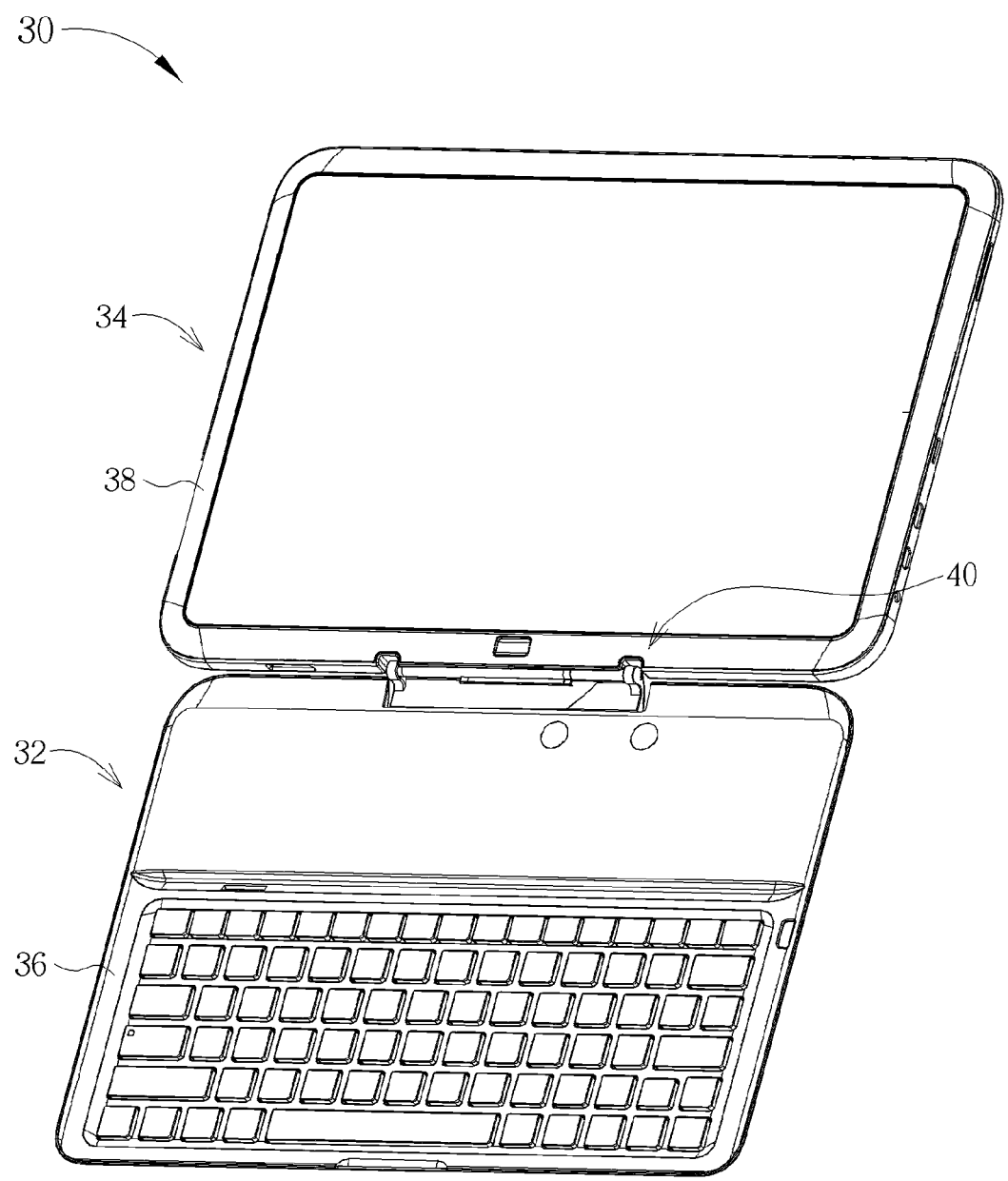
FIG. 1 is a diagram of an electronic device in an expanded status according to a first embodiment of the present invention.

Please refer to FIG. 1. FIG. 1 is a diagram of an electronic device 30 in an expanded status according to a first embodiment of the present invention. As shown in FIG. 1, the electronic device 30 includes a first module 32 and a second module 34. In this embodiment, the first module 32 is a keyboard module, and the second module 34 is a tablet computer. Implementations of the first module 32 and the second module 34 are not limited to those mentioned in this embodiment. For example, the first module 32 can be a touch panel module with a touch panel as well, and the second module 34 can be a liquid crystal display as well. As for which one of the above-mentioned designs is adopted, it depends on practical demands. Furthermore, the first module 32 includes a first casing 36 for covering inner components of the first module 32, such as a circuit board, a plunger mechanism of the keyboard, a rubber dome and so on. The second module 34 includes a second casing 38 for covering inner components of the second module 34, such as a touch panel module, a hard disk drive, a main board and so on.

Figure 2:
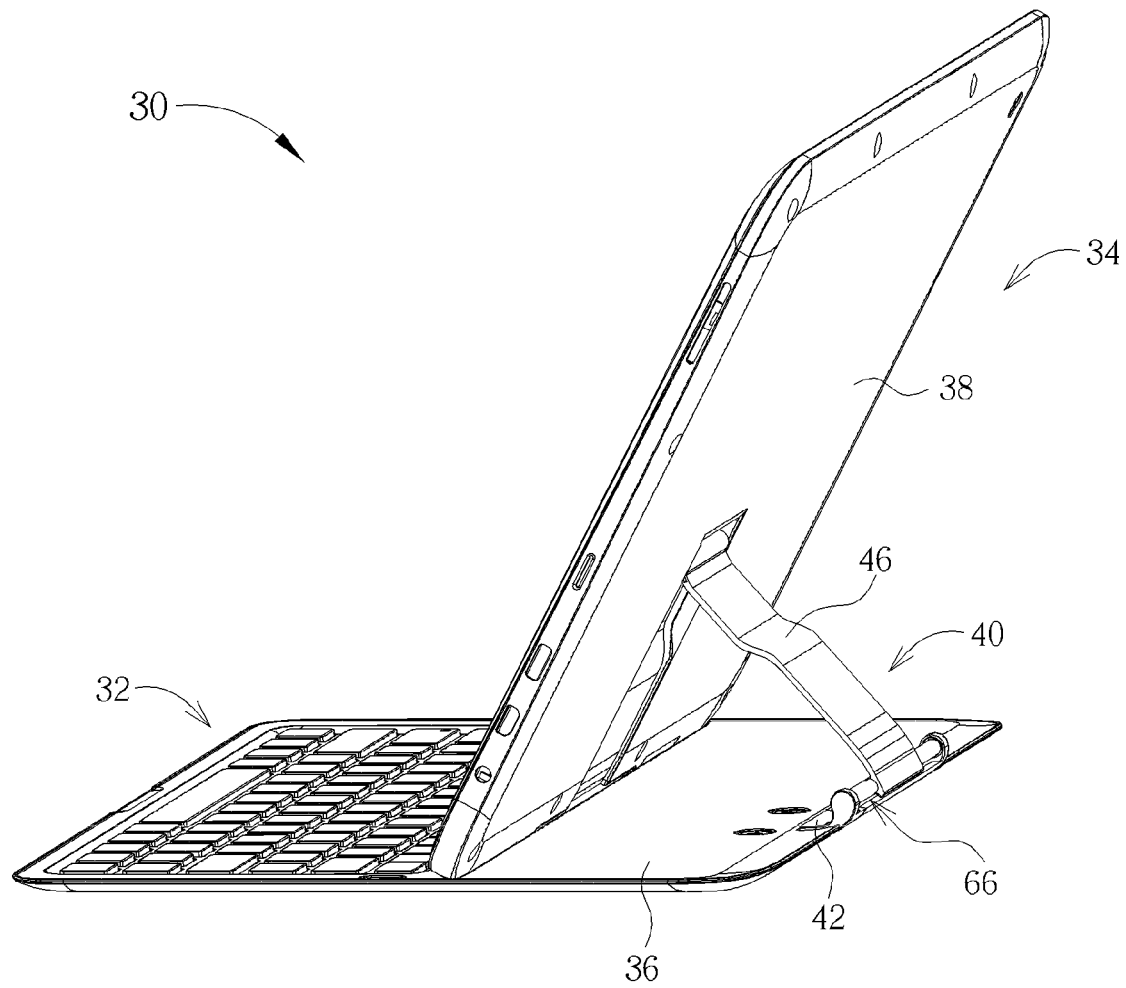
FIG. 2 is a schematic diagram of the electronic device in a using status according to the first embodiment of the present invention.

Please refer to FIG. 1 and FIG. 2. FIG. 2 is a schematic diagram of the electronic device 30 in a using status according to the first embodiment of the present invention. As shown in FIG. 1 and FIG. 2, the electronic device 30 further includes a hinge mechanism 40 for pivoting the first casing 36 and the second casing 38, so that the second casing 38 pivots relative to the first casing 36 by the hinge mechanism 40. When the electronic device 30 is in use, the second casing 38 can be pivoted relative to the first casing 36 by the hinge mechanism 40, so that the electronic device 30 is in the using status shown in FIG. 2. Alternatively, the second casing 38 can be pivoted relative to the first casing 36 by the hinge mechanism 40, so that the electronic device 30 is in the expanded status shown in FIG. 1. Furthermore, the second casing 38 can be further pivoted relative to the first casing 36 by the hinge mechanism 40, so that the second casing 38 is closed on the first casing 36 for facilitating a user to contain or carry.

Figure 3:
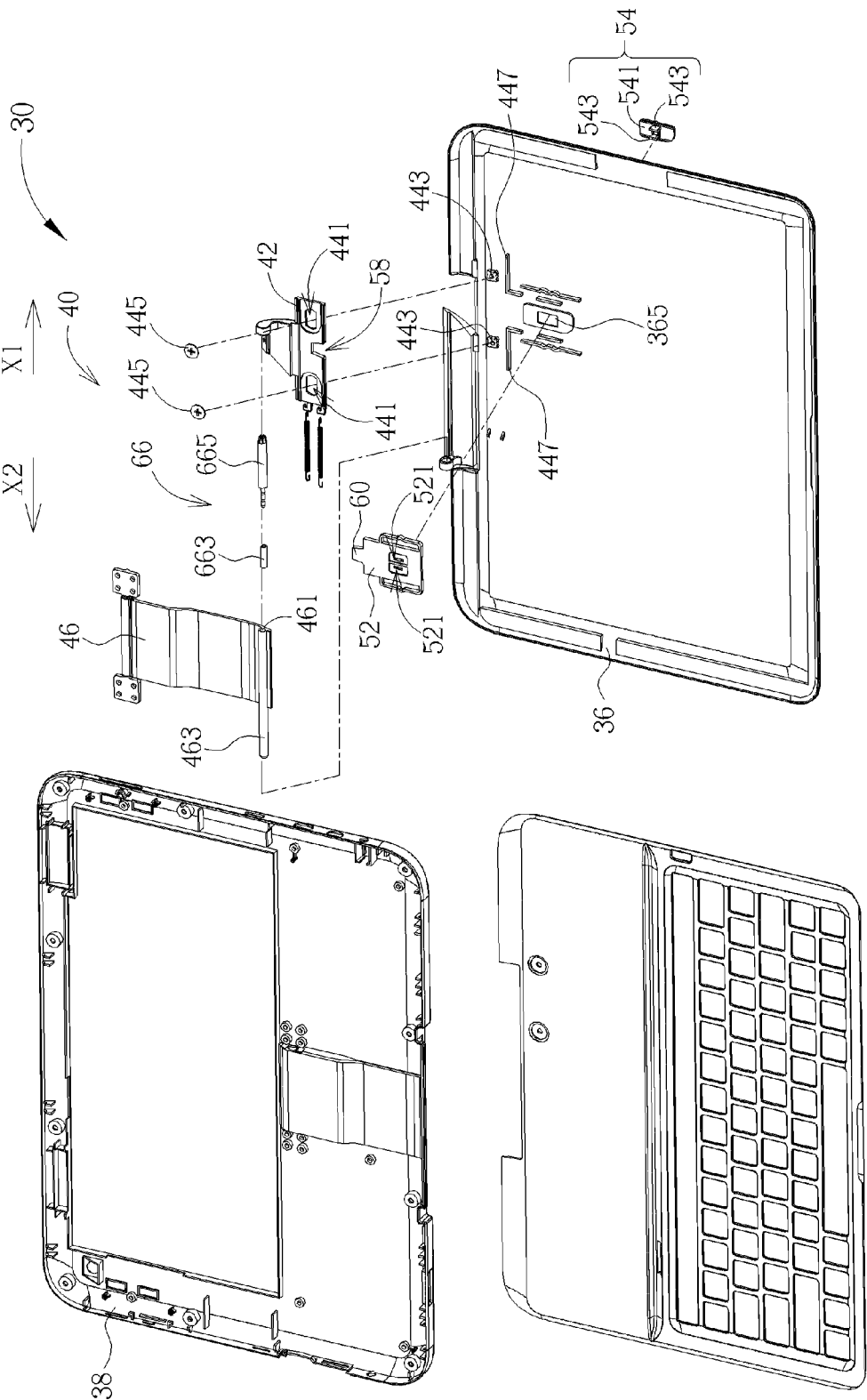
FIG. 3 is an exploded diagram of the electronic device according to the first embodiment of the present invention.
Figure 4:
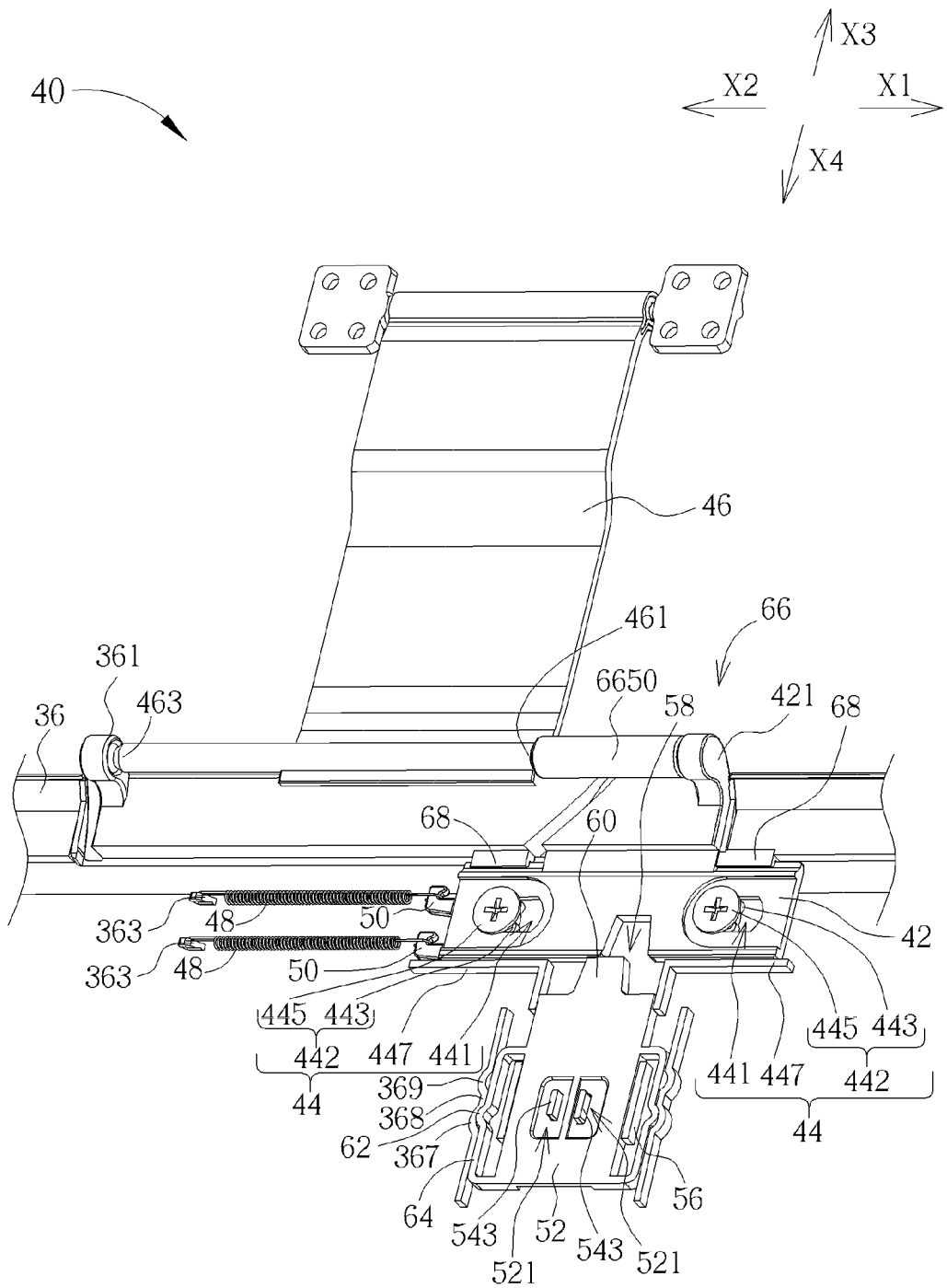
FIG. 4 is a diagram of a hinge mechanism in a separating status according to the first embodiment of the present invention.
Figure 5:
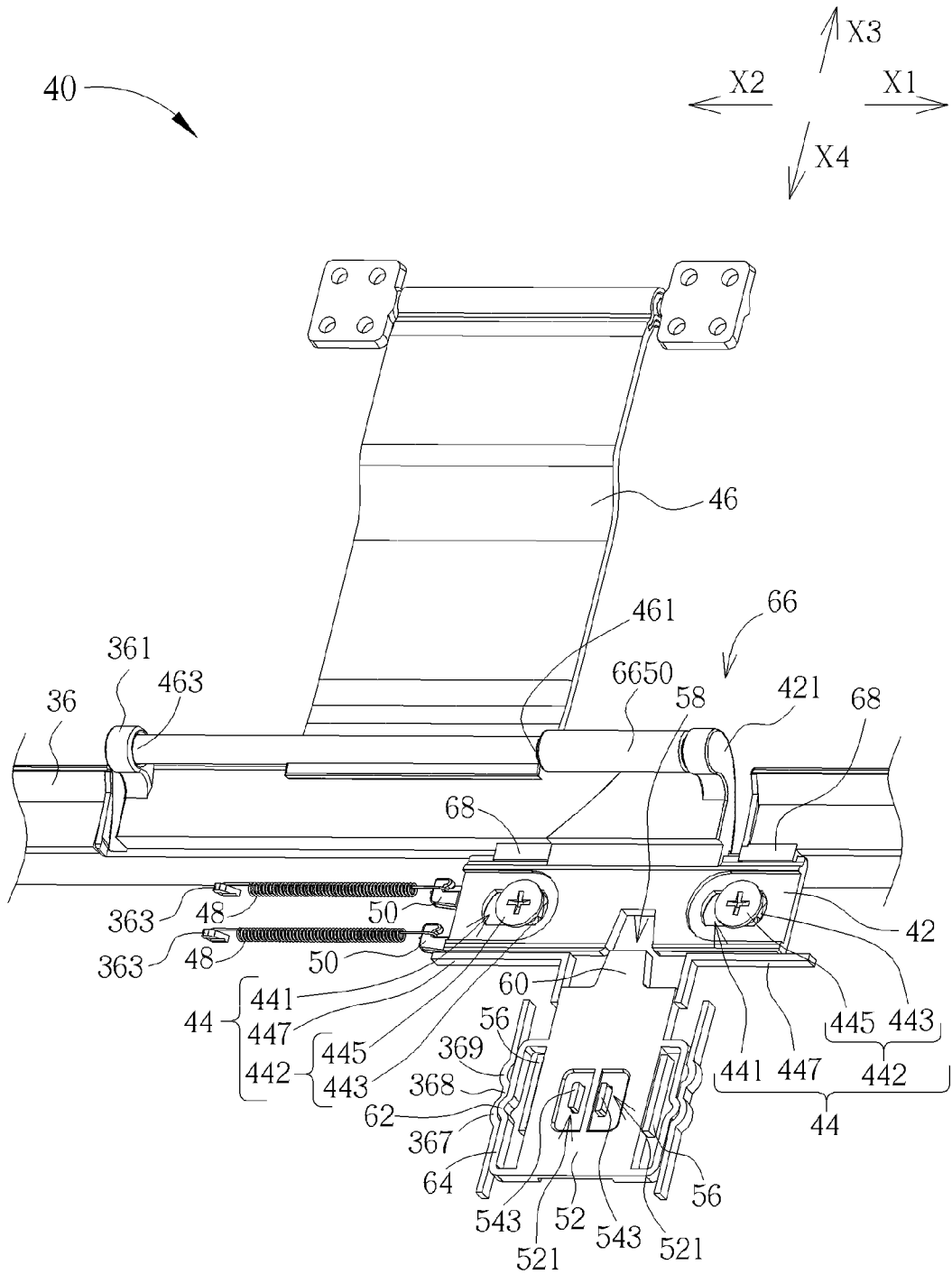
FIG. 5 is a diagram of the hinge mechanism in a wedging status according to the first embodiment of the present invention.

Please refer to FIG. 3 to FIG. 5. FIG. 3 is an exploded diagram of the electronic device 30 according to the first embodiment of the present invention. FIG. 4 is a diagram of the hinge mechanism 40 in a separating status according to the first embodiment of the present invention. FIG. 5 is a diagram of the hinge mechanism 40 in a wedging status according to the first embodiment of the present invention. As shown in FIG. 3 to FIG. 5, the hinge mechanism 40 includes a sliding member 42 and at least one sliding constraining structure 44. The sliding constraining structure 44 is used for constraining the sliding member 42 to slide relative to the first casing 36 in a first direction X1 or in a second direction X2. Accordingly, the sliding member 42 can be slidably disposed on the first casing 36 by the sliding constraining structure 44.

In this embodiment, the hinge mechanism 40 includes two sliding constraining structures 44, and each of the sliding constraining structures 44 includes a sliding slot 441 and a sliding structure 442, as shown in FIG. 4. The sliding slot 441 is formed on the sliding member 42, and an orientation of each sliding slot 441 is substantially parallel to the first direction X1 and the second direction X2. The sliding structure 442 is disposed on the first casing 36 and located in a position corresponding to the sliding slot 441. The sliding structure 442 is used for cooperating with the sliding slot 441, so as to constrain the sliding member 42 to slide relative to the first casing 36 in the first direction X1 or in the second direction X2. Furthermore, each of the sliding structures 442 includes a screw post 443 and a screw component 445. The screw posts 443 are disposed inside the corresponding sliding slot 441, and the screw component 445 is disposed through the sliding slot 441 and screwed onto the screw post 443. In other words, by cooperation of the sliding slot 441 and the screw component 445, the sliding member 42 can slide on the first casing 36. In addition, the sliding constraining structure 44 further includes a stopping strip 447 for abutting a lateral side of the sliding member 42, so as to constrain the sliding member 42 to slide in the first direction X1 or in the second direction X2.

In summary, the sliding member 42 can be oriented by the sliding slot 441 and abutted by the stopping strip 447 for moving on the first casing 36 in the first direction X1 from a second position shown in FIG. 5 to a first position shown in FIG. 4. Alternatively, the sliding member 42 can be oriented by the sliding slot 441 and abutted by the stopping strip 447 for moving on the first casing 36 in the second direction X2 from the first position shown in FIG. 4 to the second position shown in FIG. 5. The above-mentioned mechanism ensures that the sliding member 42 is capable of sliding on the first casing 36 in the first direction X1 or in the second direction X2.

Amounts and disposal positions of the sliding slot 441, the sliding structure 442, the screw post 443, the screw component 445 and the stopping strip 447 are not limited to those mentioned in this embodiment. For example, the hinge mechanism 40 can include only one sliding slot 441, one screw post 443, one screw component 445 and one stopping strip 447. In other words, structures with at least one sliding slot 441, at least one screw post 443, at least one screw component 445 and at least one stopping strip 447 are within the scope of the present invention. Furthermore, structures of the sliding constraining structure 44 are not limited to the sliding slot, the screw post, the screw component and the sopping strip illustrated in this embodiment. For example, the sliding constraining structure 44 can selectively adopt some of the above-mentioned components. The sliding member 42 can be slidably disposed on the first casing 36 by utilizing sliding slot and sliding track, or the sliding structure 442 can be a hot melting post and so on. As for which one of the above-mentioned designs is adopted, it depends on practical demands.

As mentioned in FIG. 2 to FIG. 5, the sliding member 42 includes a first bearing portion 421, and the first casing 36 includes a second bearing portion 361. Furthermore, the hinge mechanism 40 further includes a pivoting member 46 for pivoting the first casing 36 and the second casing 38, as shown in FIG. 2, to make the second casing 38 be capable of pivoting relative to the first casing 36. Accordingly, the electronic device 30 can be in the using status shown in FIG. 2, or the electronic device 30 can be in the expanded status shown in FIG. 1. Furthermore, the second casing 38 of the electronic device 30 can be further closed onto the first casing 36 for facilitating the user to contain or carry.

In addition, the pivoting member 46 includes a first pivotal portion 461 and a second pivotal portion 463. In this embodiment, the first pivotal portion 461 of the pivoting member 46 is pivoted to the first bearing portion 421 of the sliding member 42, and the second pivotal portion 463 of the pivoting member 46 is pivoted to the second bearing portion 361 of the first casing 36. When the pivoting member 46 is desired to be installed onto the sliding member 42 and the first casing 36, the first pivotal portion 461 of the pivoting member 46 is inserted into the first bearing portion 421 of the sliding member 42 first, and then the pivoting member 46 is pushed in the first direction X1 for driving the sliding member 42 to slide in the first direction X1 to the first position shown in FIG. 4. At the meantime, the second pivotal portion 463 of the pivoting member 46 can be aligned with the second bearing portion 361 of the first casing 36. Then, the pivoting member 46 and the sliding member 42 are further slid in the second direction X2 to the second position shown in FIG. 5. At the meantime, the second pivotal portion 463 is inserted into the second bearing portion 361 of the first casing 36.

In such a manner, the first pivotal portion 461 and the second pivotal portion 463 of the pivoting member 46 can be respectively installed in the first bearing portion 421 of the sliding member 42 and in the second bearing portion 361 of the first casing 36. As mentioned above, by the aforesaid pivoting mechanism of the first pivotal portion 461, the first bearing portion 421, the second pivotal portion 463 and the second bearing portion 361, the pivoting member 46 can pivot relative to the first casing 36 for driving the second casing 38 to pivot relative to the first casing 36, so that the electronic device 30 is in the using status shown in FIG. 2 or in the expanded status shown in FIG. 1 corresponding to practical situations.

Furthermore, the first casing 36 includes a first connecting portion 363, and the hinge mechanism 40 further includes a resilient member 48 and a second connecting portion 50. The second connecting portion 50 is disposed on a side of the sliding member 42, and both ends of the resilient member 48 are respectively connected to the first connecting portion 363 and the second connecting portion 50. When the sliding member 42 is located in the first position shown in FIG. 4, the both ends of the resilient member 48 are respectively stretched by the first connecting portion 363 and the second connecting portion 50. At the meantime, the resilient member 48 is stretched to store a resiliently potential energy. When the sliding member 42 is released from the first position shown in FIG. 4, the resilient member 48 releases the resiliently potential energy to generate a resilient recovering force, so as to drive the sliding member 42 to slide in the second direction X2 from the first position shown in FIG. 4 to the second position shown in FIG. 5. In other words, the resilient member 48 is used for driving the sliding member 42 to recover from the first position shown in FIG. 4 to the second position shown in FIG. 5.

In this embodiment, the first casing 36 includes two first connecting portions 363, and the hinge mechanism 40 includes two resilient members 48 and two second connecting portions 50. The two second connecting portions 50 are disposed on two corners of the side of the sliding member 42, respectively. The two ends of each resilient member 48 are connected to the corresponding first connecting portion 363 and the corresponding second connecting portion 50, respectively. Accordingly, the aforesaid two first connecting portions 363, the two resilient members 48 and the two second connecting portions 50 facilitate stability of the sliding member 42 during recovery process. Amounts and disposal positions of the first connecting portion 363, the resilient member 48 and the second connecting portion 50 are not limited to those mentioned in this embodiment. The present invention can include one first connecting portion 363, one resilient member 48 and one second connecting portion 50 as well. The first connecting portion 363, the resilient member 48 and the second connecting portion 50 are arranged in a central line of the sliding member 42. In other words, structures with at least one first connecting portion 363, at least one resilient member 48 and at least one second connecting portion 50 are within the scope of the present invention.

In this embodiment, the first connecting portion 363 and the second connecting portion 50 are, but not limited to, respectively a hook structure. For example, the first connecting portion 363 and the second connecting portion 50 can be respectively a through hole structure. Thus, the two ends of the resilient member 48 can hook inside the corresponding through hole structure. In other words, structures of the first connecting portion 363 and the second connecting portion 50 capable of connecting the two ends of the resilient member 48 are within the scope of the present invention.

As mentioned above, the resilient member 48 of the present invention can be omitted, i.e. the hinge mechanism 40 of the present invention can omit automatic recovery function resulting from the resilient member 48. Under this circumstance, when the sliding member 42 is desired to recover from the first position shown in FIG. 4 to the second position shown in FIG. 5, the sliding member 42 is pushed from the first position to the second position in a manual manner. As for which one of the above-mentioned designs is adopted, it depends on practical demands.

Figure 6:
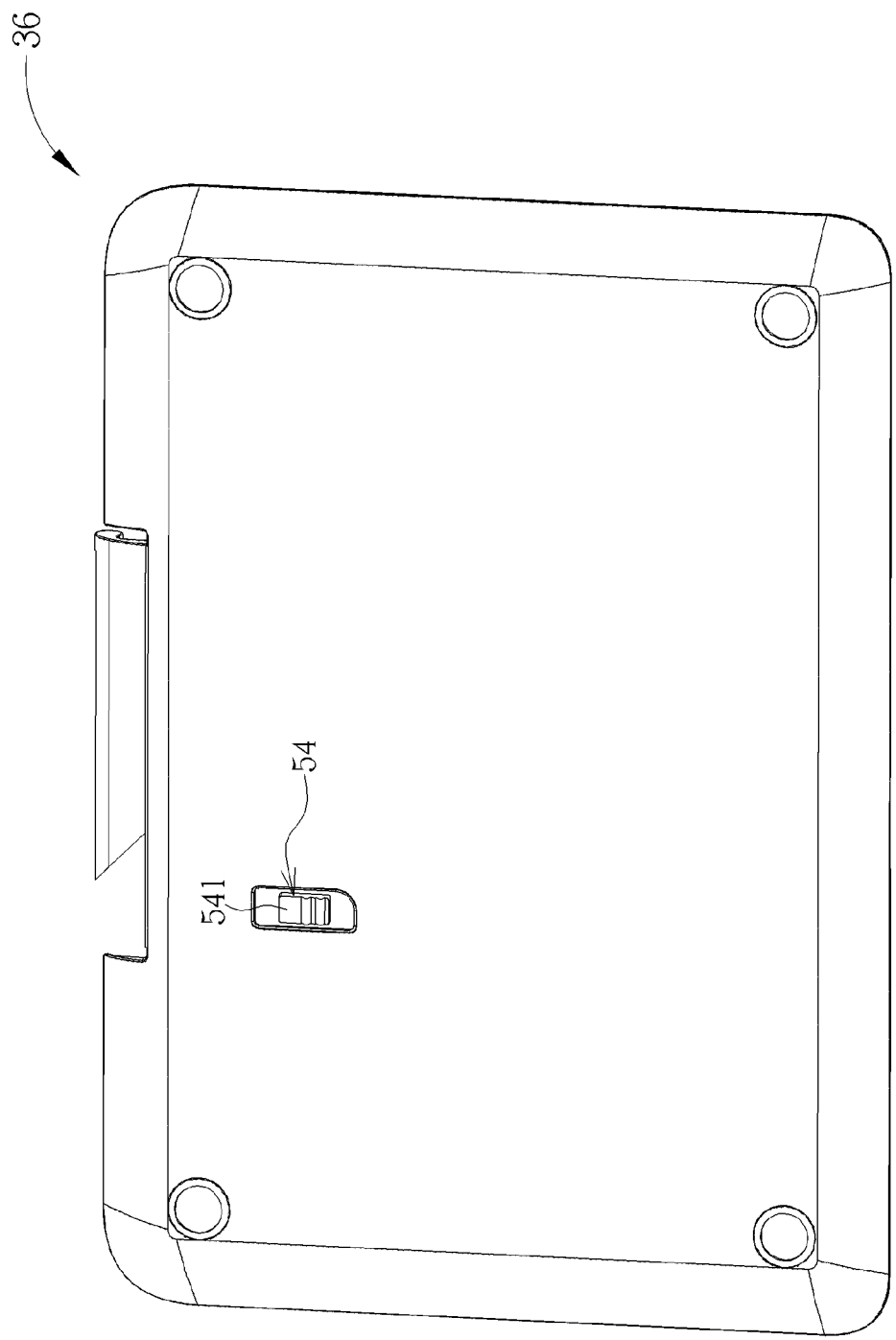
FIG. 6 is a diagram of a first casing in another view according to the first embodiment of the present invention.
Figure 7:
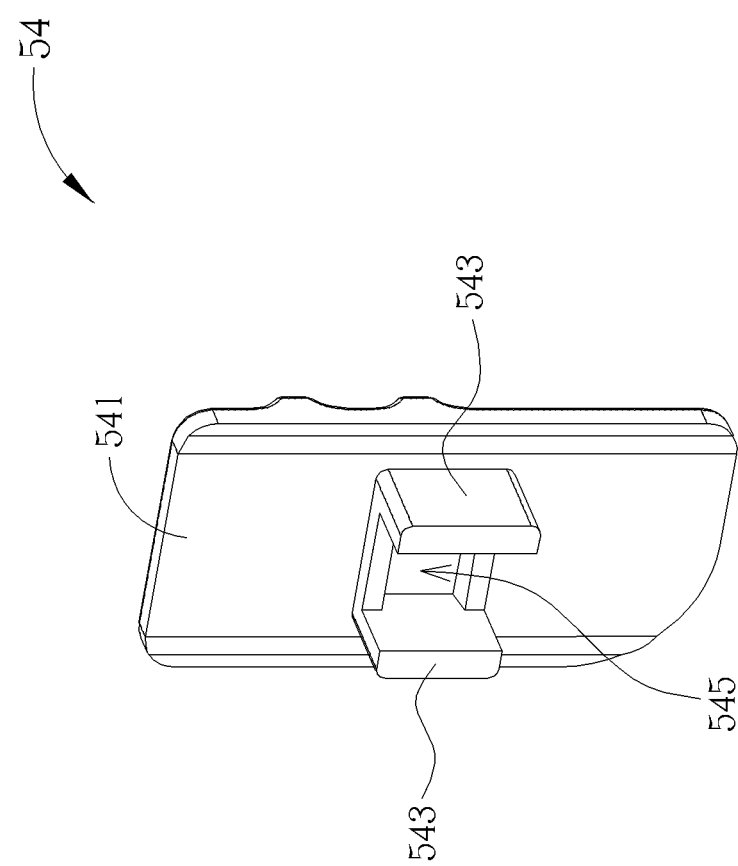
FIG. 7 is a diagram of a pushbutton in another view according to the first embodiment of the present invention.

As shown in FIG. 4 and FIG. 5, the hinge mechanism 40 further includes a wedging member 52 disposed on the first casing 36 in a slidable manner, and an engaging slot 521 is formed on the wedging member 52. Please refer to FIG. 6. FIG. 6 is a diagram of the first casing 36 in another view according to the first embodiment of the present invention. As shown in FIG. 6, the hinge mechanism 40 further includes a push button 54 for driving the wedging member 52 to slide relative to the first casing 36. Please refer to FIG. 3, FIG. 6 and FIG. 7. FIG. 7 is a diagram of the push button 54 in another view according to the first embodiment of the present invention. As shown in FIG. 3, FIG. 6 and FIG. 7, an opening 365 is formed on the first casing 36, and the push button 54 includes a button body 541 and two fixing structures 543. The button body 541 is slidably installed on a bottom side of the first casing 36, and the fixing structures 543 respectively protrude from the button body 541.

When assembling the first casing 36, the wedging member 52 and the push button 54, the fixing structures 543 of the push button 54 are disposed through the opening 365 on the first casing 36, and then the fixing structures 543 of the push button 54 are fixed inside the engaging slot 521 on the wedging member 52. Accordingly, the button body 541 of the push button 54 can be exposed on the bottom side of the first casing 36, as shown in FIG. 6, so as to provide a place for the user to push. In this embodiment, the fixing structures 543 of the push button 54 are fixed inside the engaging slot 521 on the wedging member 52 in a hot melting manner, i.e. the fixing structures 543 of the push button 54 are a hot melting post, respectively. Structures of the fixing structures 543 are not limited to those mentioned in this embodiment. For example, the fixing structures 543 of the push button 54 can be hooked inside the engaging slot 521 on the wedging member 52 as well, i.e. the fixing structures 543 of the push button 54 can be respectively a hook structure as well. In such a manner, when the button body 541 exposed the bottom side of the first casing 36 is pushed, the button body 541 is capable of driving the wedging member 52 wedged with the fixing structures 543 to make the wedging member 52 slide relative to the first casing 36.

It should be noticed that amounts and disposal positions of the fixing structure 543 of the push button 54 and the engaging slot 521 on the wedging member 52 are not limited to those mentioned in this embodiment. For example, the push button 54 can include one fixing structure 543, one engaging slot 521 corresponding to the one fixing structures 543 can be formed on the wedging member 52. In other words, structures with at least one fixing structures 543 and at least one engaging slot 521 are within the scope of the present invention.

Figure 8:
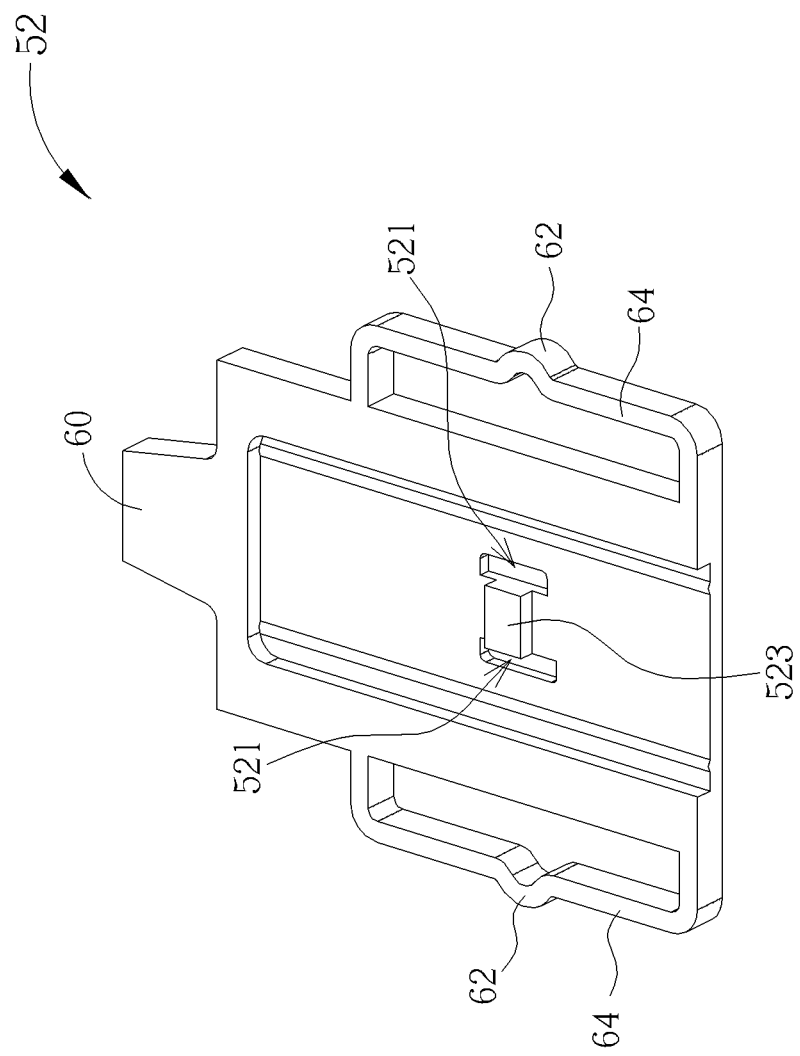
FIG. 8 is a diagram of a wedging member in another view according to the first embodiment of the present invention.

Please refer to FIG. 7 and FIG. 8. FIG. 8 is a diagram of the wedging member 52 in another view according to the first embodiment of the present invention. As shown in FIG. 7 and FIG. 8, a sunken portion 545 is formed on the button body 541 and located in a position between the two fixing structures 543. A protruding portion 523 is formed on the wedging member 52 and located in a position corresponding to the sunken portion 545. When the fixing structures 543 of the push button 54 is engaged with the engaging slot 521 on the wedging member 52, the protruding portion 523 on the wedging member 52 is contained inside the sunken portion 545 on the button body 541. In such a manner, when the wedging member 52 is pushed by the push button 54, the protruding portion 523 and the fixing structures 543 can facilitate the push button 54 to push the wedging member 52, so that the wedging member 52 is capable of sliding on the first casing 36 more reliably.

As shown in FIG. 4 and FIG. 5, the hinge mechanism 40 further includes two constraining ribs 56 disposed on the first casing 36 and located in positions corresponding to two sides of the wedging member 52, respectively. When the wedging member 52 is driven to slide on the first casing 36 by the push button 54, the constraining ribs 56 are used for constraining the wedging member 52 to slide relative to the first casing 36 in a third direction X3 or in a fourth direction X4. In this embodiment, the third direction X3 and the fourth direction X4 are, but not limited to, substantially perpendicular to the first direction X1 and the second direction X2. In other words, the third direction X3 and the fourth direction X4 can not be perpendicular to the first direction X1 and the second direction X2. As for which one of the aforesaid designs is adopted, it depends on practical demands.

It should be noticed that an amount and disposal positions of the constraining ribs 56 are not limited to those mentioned in this embodiment. For example, the hinge mechanism 40 can include only one constraining rib 56 formed on the first casing 36, and a constraining slot, not shown in figures, is formed on the wedging member 52 and located in a position corresponding to the constraining rib 56. The constraining rib 56 is slidably engaged inside the constraining slot, so as to constrain the wedging member 52 to slide on the first casing 36 in the third direction X3 or in the fourth direction X4. In other words, the structure with at least one constraining rib 56 is within the scope of the present invention.

Figure 9:
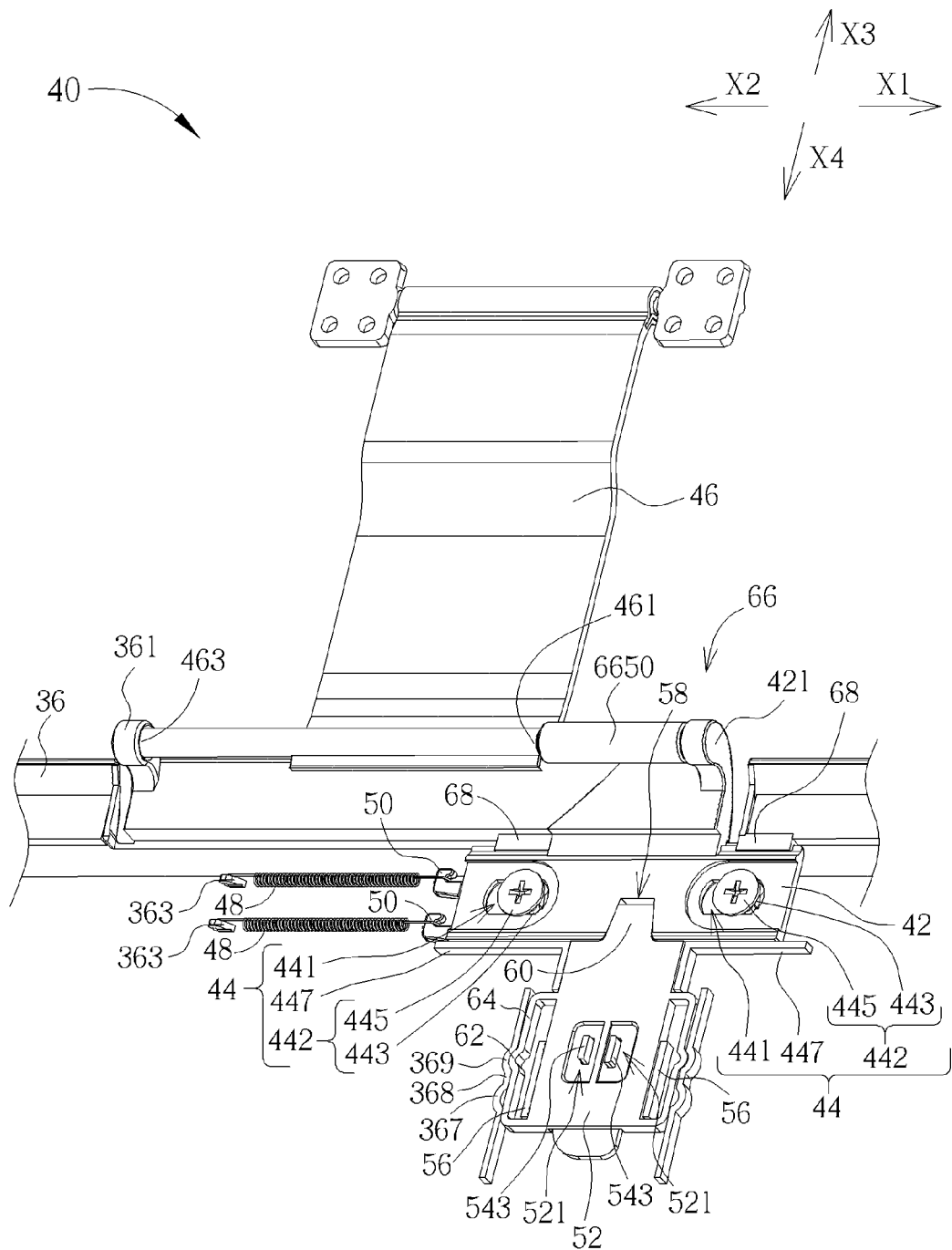
FIG. 9 is a diagram of the hinge mechanism in the wedging status according to the first embodiment of the present invention.

Please refer to FIG. 4, FIG. 5 and FIG. 9. FIG. 9 is a diagram of the hinge mechanism 40 in the wedging status according to the first embodiment of the present invention. As shown in FIG. 4, FIG. 5 and FIG. 9, the hinge mechanism 40 further includes a first wedging structure 58 and a second wedging structure 60. The first wedging structure 58 is disposed on a side of the sliding member 42, and the second wedging structure 60 is disposed on a side of the wedging member 52 corresponding to the side of the sliding member 42. When the sliding member 42 is driven to slide from the first position shown in FIG. 4 to the second position shown in FIG. 5 by the resilient member 48 or manually, the button body 541 of the push button 54 can be pushed in the third direction X3, so that the fixing structures 543 of the push button 54 drives the wedging member 52 to slide in the third direction X3, until the wedging member 52 is located in a second position shown in FIG. 9.

At the meantime, the second wedging structure 60 of the wedging member 52 engages with the first wedging structure 58 of the sliding member 42. Accordingly, the wedging member 52 is capable of fixing the sliding member 42 in the second position. In summary, when the sliding member 42 is driven to the second position shown in FIG. 5, the wedging member 52 is capable of wedging the sliding member 42, so as to fix the sliding member 42 in the second position. In this embodiment, the first wedging structure 58 is a recessed slot, and the second wedging structure 60 is a protruding structure. Implementations of the first wedging structure 58 and the second wedging structure 60 is not limited to those mentioned above. For example, the first wedging structure 58 and the second wedging structure 60 can be respectively a hook and a hooking slot as well. As for which one of the above-mentioned designs is adopted, it depends on practical demands.

In addition, a first constraining portion 367, a connecting portion 368 and a second constraining portion 369 are further formed on the first casing 36. Furthermore, the hinge mechanism 40 further includes a protruding structure 62 and a resilient structure 64. The protruding structure 62 is used for selectively engaging with the first constraining portion 367 or the second constraining portion 369, and the resilient structure 64 is resiliently connected to the wedging member 52 and the protruding structure 62. As shown in FIG. 5 and FIG. 9, when the sliding member 42 is driven to the second position shown in FIG. 5, the wedging member 52 is driven by the push button 54 to slide in the third direction X3 from a released position shown in FIG. 5 to the second position shown in FIG. 9. When the protruding structure 62 is not engaged with the first constraining portion 367 or the second constraining portion 369, the protruding structure 62 is pressed by the connecting portion 368, so that the resilient structure 64 is resiliently deformed to store a resiliently potential energy.

When the wedging member 52 slides to the second position shown in FIG. 9, the connecting portion 368 does not press the protruding structure 62. Thus, the resilient structure 64 can release the resiliently potential energy to provide a resilient force, so as to drive the protruding structure 62 to engage with the second constraining portion 369. Accordingly, the wedging member 52 is capable of being fixed in the second position. Furthermore, when the wedging member 52 is fixed in the second position, the second wedging structure 60 of the wedging member 52 is simultaneously wedged with the first wedging structure 58 of the sliding member 42. Accordingly, the wedging member 52 is capable of fixing the sliding member 42 in the second position stably, so that the first pivotal portion 461 of the pivoting member 46 is capable of being pivoted to the first bearing portion 421 of the sliding member 42 firmly. In such a manner, the pivoting member 46 can pivot the second casing 38 to the first casing 36 by the sliding member 42 and the wedging member 52.

On the other hand, when the second casing 38 is desired to be detached from the first casing 36, the push button 54 is utilized for driving the wedging member 52 to slide the wedging member 52 from the second position shown in FIG. 9 to the released position shown in FIG. 5 in the fourth direction X4. During the above-mentioned process, the protruding structure 62 is pressed by the connecting portion 368, so that the resilient structure 64 deforms for storing the resiliently potential energy. When the wedging member 52 slides to the released position shown in FIG. 5, the connecting portion 368 does not press the protruding structure 62. Thus, the resilient structure 64 releases the resiliently potential energy for providing the resilient force, so as to drive the protruding structure 62 to engage with the first constraining portion 367. Accordingly, the wedging member 52 is capable of being fixed in the released position.

At the meantime, the second wedging structure 60 of the wedging member 52 simultaneously separates from the first wedging structure 58 of the sliding member 42. Thus, the first pivotal portion 461 of the pivoting member 46 is capable of driving the sliding member 42 to slide to the first position shown in FIG. 4 in the first direction X1. Accordingly, the second pivotal portion 463 of the pivoting member 46 is capable of separating from the second bearing portion 361 of the first casing 36. Afterwards, the first pivotal portion 461 of the pivoting member 46 is detached from the first bearing portion 421 of the sliding member 42, so as to detach the second casing 38 and the pivoting member 46 from the first casing 36.

In summary, the present invention utilizes the first pivotal portion 461 of the pivoting member 46 to slide the sliding member 42 between the released position and the second position. When the first pivotal portion 461 of the pivoting member 46 slides the sliding member 42 to the first position, the second pivotal portion 463 of the pivoting member 46 is capable of separating from the second bearing portion 361 of the first casing 36, so as to detach the first pivotal portion 461 of the pivoting member 46 from the first bearing portion 421 of the sliding member 42. In such a manner, the first casing 36 and the second casing 38 of the present invention can be easily detached.

On the other hand, when the first pivotal portion 461 of the pivoting member 46 slides the sliding member 42 to the first position, the second pivotal portion 463 of the pivoting member 46 is capable of being aligned with the second bearing portion 361 of the first casing 36. Afterwards, the sliding member 42 and the pivoting member 46 are pushed to the second position in the second direction X2, so that the second pivotal portion 463 of the pivoting member 46 is inserted into the second bearing portion 361 of the first casing 36. Accordingly, the second casing 38 is capable of being pivoted to the first casing 36. Finally, the wedging member 52 is slid to the second position for wedging the sliding member 42 in the second position. In such a manner, the second casing 38 can be pivoted to the first casing 36 for easily installing the first casing 36 and the second casing 38.

Figure 10:
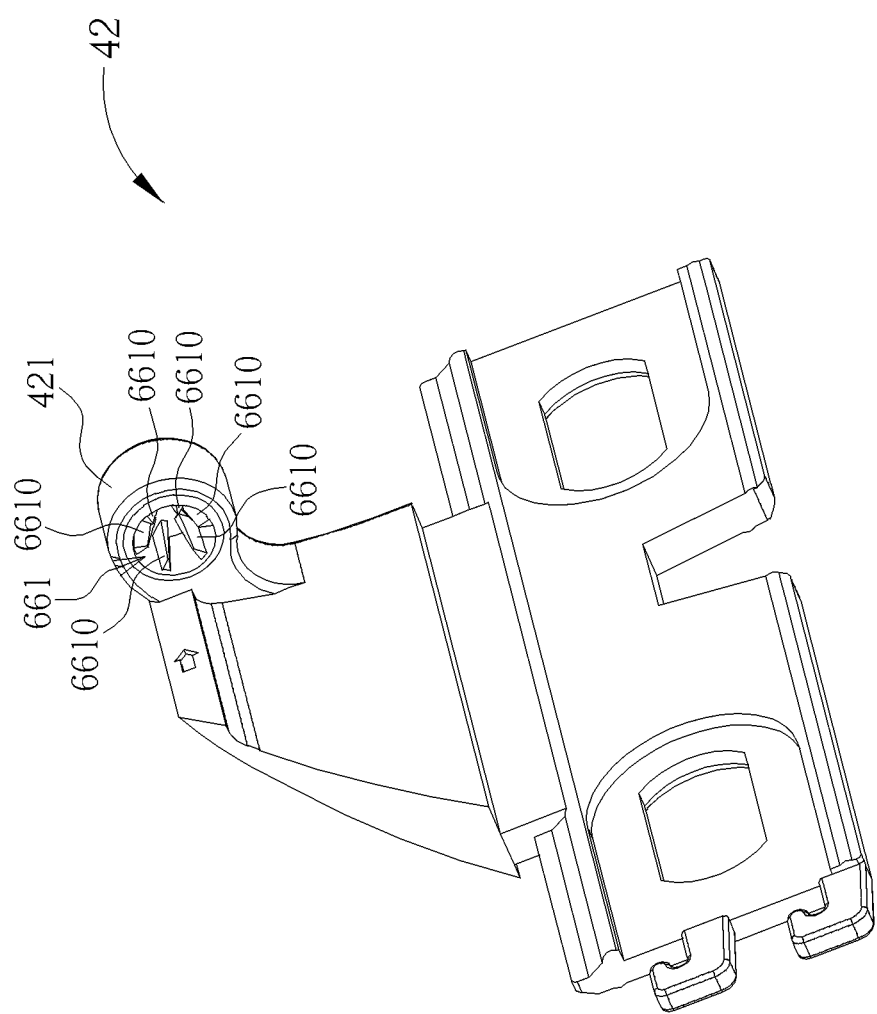
FIG. 10 is a diagram of a sliding member 2 in another view according to the first embodiment of the present invention.

Please refer to FIG. 3, FIG. 9 and FIG. 10. FIG. 10 is a diagram of the sliding member 42 in another view according to the first embodiment of the present invention. The hinge mechanism 40 further includes a first torque module 66 connected to the first pivotal portion 461 of the pivoting member 46 and the first bearing portion 421 of the sliding member 42. The first torque module 66 is used for providing the pivoting member 46 with a torque. When the second casing 38 is rotated relative to the first casing 36 to a specific angle, the torque can fix the second casing 38 in the specific angle, so that the user can adjust the second casing 38 according to preference. Furthermore, when the electronic device 30 is in use, the first torque module 66 of the hinge mechanism 40 can avoid the first casing 36 and the second casing 38 from vibration, so that the electronic device 30 is capable of being operated stably.

As shown in FIG. 3, FIG. 9 and FIG. 10, the first torque module 66 includes a first engaging member 661 and a first sleeve 663. The first engaging member 661 is fixed inside the first bearing portion 421 of the sliding member 42, and the first sleeve 663 is disposed inside the first pivotal portion 461 of the pivoting member 46. In this embodiment, the first engaging member 661 and the first sleeve 663 are made of metal material, and the first engaging member 661 and the first bearing portion 421 of the sliding member 42 are, but not limited to, integrally formed in an insert molding manner. For example, the first engaging member 661 can be fixed inside the first bearing portion 421 of the sliding member 42 in a hot melting manner as well. In other words, the structures capable of fixing the first engaging member 661 and the first bearing portion 421 are within the scope of the present invention.

Figure 11:
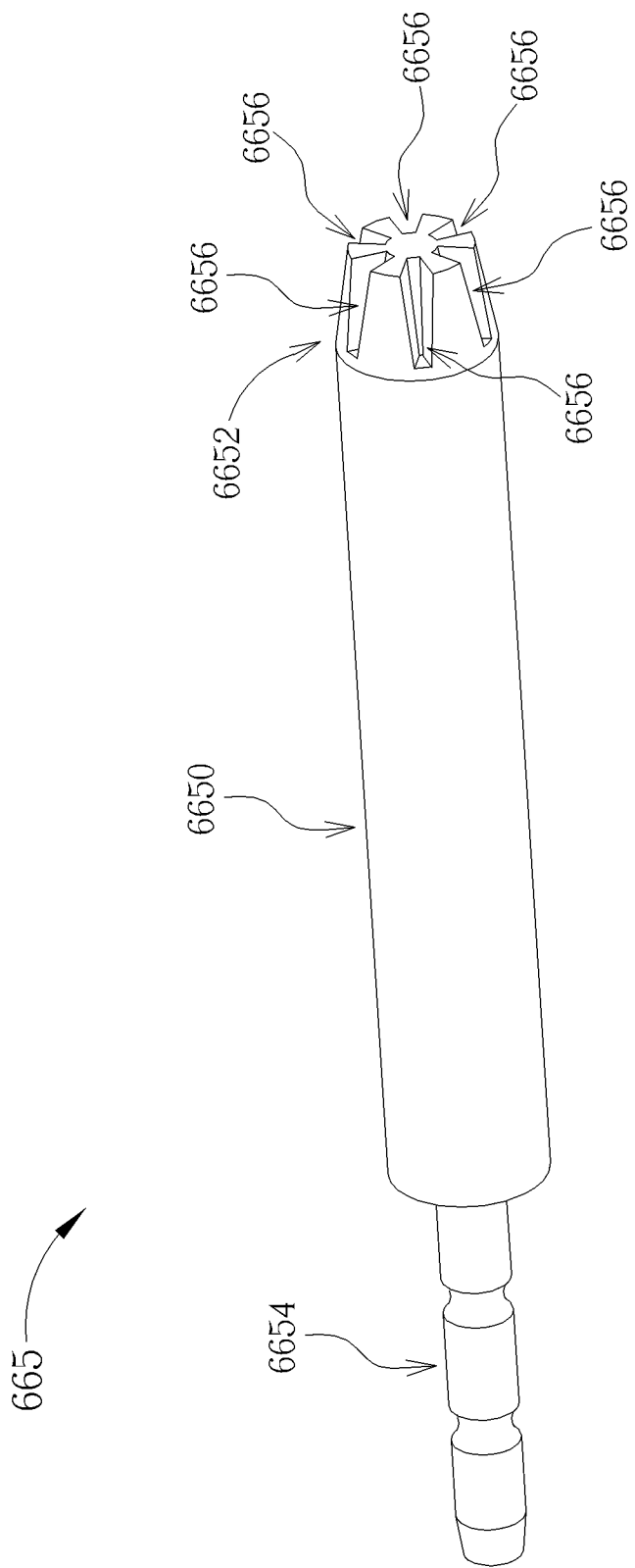
FIG. 11 is a diagram of a first shaft according to the first embodiment of the present invention.

Furthermore, the first torque module 66 further includes a first shaft 665. In this embodiment, the first shaft 665 is made of metal material. Please refer to FIG. 11 together. FIG. 11 is a diagram of the first shaft 665 according to the first embodiment of the present invention. The first shaft 665 includes a first shaft body 6650, a first engaging end portion 6652 and a first rotable end portion 6654. The first engaging end portion 6652 is connected to an end of the first shaft body 6650, and the first rotable end portion 6654 is connected to the other end of the first shaft body 6650. In addition, the first engaging member 661 includes a plurality of protrusions 6610, and the first engaging end portion 6652 includes a plurality of sunken slots 6656 corresponding to the plurality of protrusions 6610.

The description for principle of the first torque module 66 is provided as follows. First, the first sleeve 663 is disposed inside the first pivotal portion 461 of the pivoting member 46. Afterwards, the first sleeve 663 rotably sheathes the first rotable end portion 6654 of the first shaft 665 in a tight fit manner. Accordingly, the first shaft 665 is capable of being installed on the pivoting member 46 by the first sleeve 663 and the first rotable end portion 6654 in a tight fit manner. Afterwards, the plurality of sunken slots 6656 of the first engaging end portion 6652 of the first shaft 665 are aligned with the plurality of protrusions 6610 of the first engaging member 661, respectively. Finally, the first engaging end portion 6652 of the first shaft 665 is inserted into the first engaging member 661. At the meantime, the plurality of sunken slots 6656 respectively contain the protrusions 6610, so that the first engaging end portion 6652 engages with the first engaging member 661, so as to fix the first shaft body 6650.

In other words, when the first shaft 665 and the pivoting member 46 are installed with the first engaging member 661, the first shaft 665 is fixed and incapable of rotating since the first engaging end portion 6652 of the first shaft 665 is engaged with the first engaging member 661 in the first bearing portion 421 of the sliding member 42. When the second casing 38 and/or the pivoting member 46 is rotated, the first pivotal portion 461 of the pivoting member 46 can pivot relative to the first rotable end portion 6654 of the first shaft 665 via the first sleeve 663. Furthermore, since the first pivotal portion 461, the first rotable end portion 6654 and the first sleeve 663 are combined in a tight fit manner and since the first pivotal portion 461 of the pivoting member 46 simultaneously rotate with the first sleeve 663, a friction force is generated between the first sleeve 663 and the first rotable end portion 6654 when the first pivotal portion 461 of the pivoting member 46 pivots relative to the first rotable end portion 6654 of the first shaft 665. As a result, the friction force can provide the second casing 38 with the torque for holding the second casing 38 at the specific angel.

It should be noticed that the first sleeve 663 of the present invention can be omitted. In other words, the first pivotal portion 461 of the pivoting member 46 can directly sheathe the first rotable end portion 6654 of the first shaft 665 in a tight fit manner. When the second casing 38 and/or the pivoting member 46 are rotated, the first pivotal portion 461 of the pivoting member 46 is capable of pivoting relative to the first rotable end portion 6654 of the first shaft 665. Furthermore, since the first pivotal portion 461 and the first rotable end portion 6654 are combined in a tight fit manner, a friction force is generated between the first pivotal portion 461 and the first rotable end portion 6654 when the first pivotal portion 461 of the pivoting member 46 pivots relative to the first rotable end portion 6654 of the first shaft 665. As a result, the friction force can provide the second casing 38 with the torque for holding the second casing 38 at the specific angel. As for which one of the above-mentioned designs is adopted, it depends on practical demands.

In summary, the hinge mechanism 40 of the present invention can utilize the first torque module 66 to provide the second casing 38 with the torque for holding the second casing 38 at the specific angle. In other words, when the second casing 38 pivots relative to the first casing 36 at the specific angle, the torque provided by the first torque module 66 can fix the second casing 38 at the specific angle, so that the user can adjust the second casing 38 according to preferences. In addition, when the electronic device 30 is in use, the torque provided by the first torque module 66 of the hinge mechanism 40 can prevent the first casing 36 and the second casing 38 from vibration, so as to provide the electronic device 30 with a good feeling of operation.

Figure 12:
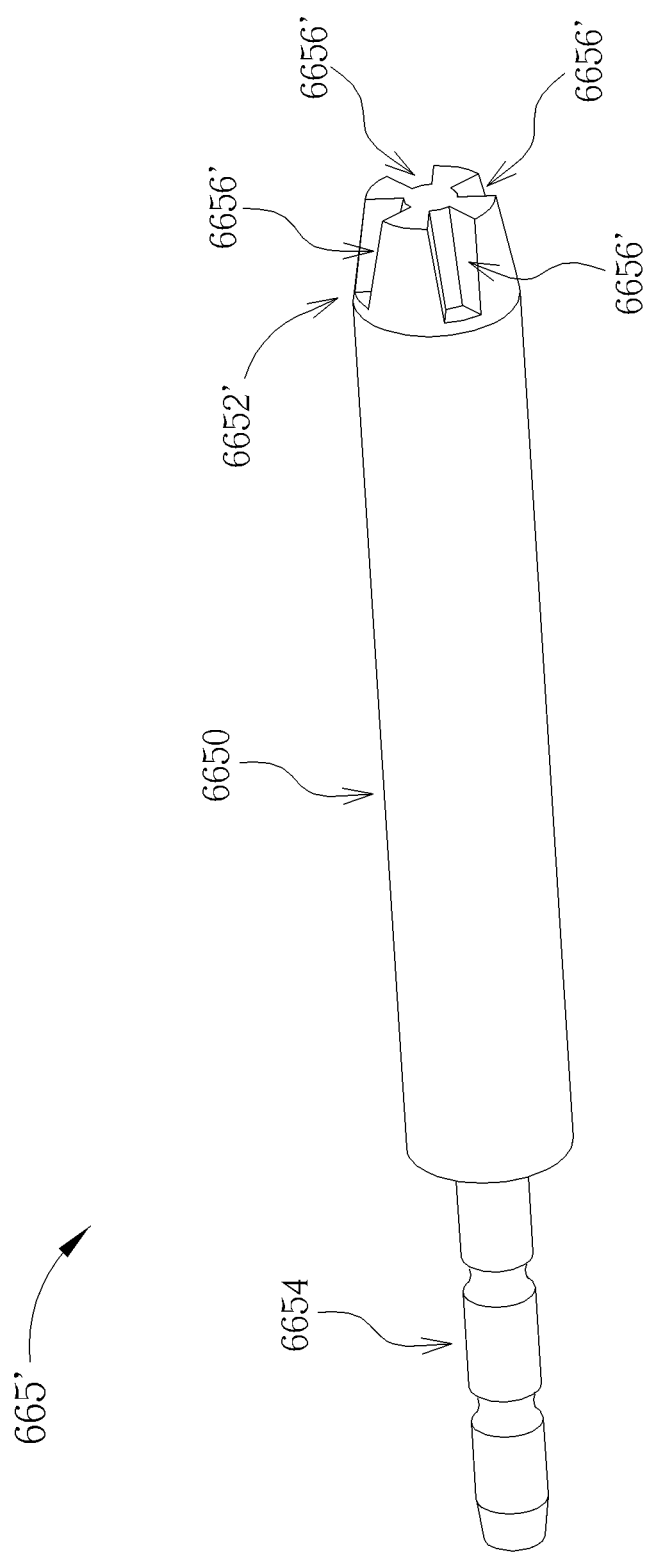
FIG. 12 is a diagram of a first shaft according to another embodiment of the present invention.

In this embodiment, the first engaging member 661 includes six protrusions 6610, and the first engaging end portion 6652 includes six sunken slots 6656 correspondingly. Amounts of the protrusion 6610 and the sunken slot 6656 are not limited to those mentioned in this embodiment. Please refer to FIG. 12 and FIG. 11. FIG. 12 is a diagram of a first shaft 665' according to another embodiment of the present invention. As shown in FIG. 12 and FIG. 11, the main difference between the first shaft 665' and the aforesaid first shaft 665 is that a first engaging end portion 6652' of the first shaft 665' includes four sunken slots 6656'. Similarly, the first engaging member includes four protrusions correspondingly. As for which one of the aforesaid designs is adopted, it depends on practical demands.

As shown in FIG. 9, the hinge mechanism. 40 can further include at least one constraining plate 68 disposed on the first casing 36 and located in a position corresponding to a side of the sliding member 42. When the second casing 38 is rotated relative to the first casing 36, the torque provided by the first torque module 66 and for holding the second casing 38 at the specific angle generates a reaction force. Thus, the reaction force might turn over the sliding member 42. Under the above-mentioned circumstance, the constraining plate 68 can constrain the sliding member 42 on the first casing 36 without turning over, so as to prevent the first torque module 66 from failure due to turning over of the sliding member 42. In this embodiment, the hinge mechanism 40 includes two constraining plate 68. An amount and disposal positions of the constraining plate 68 are not limited to those mentioned in this embodiment, and it depends on practical demands.

Figure 13:
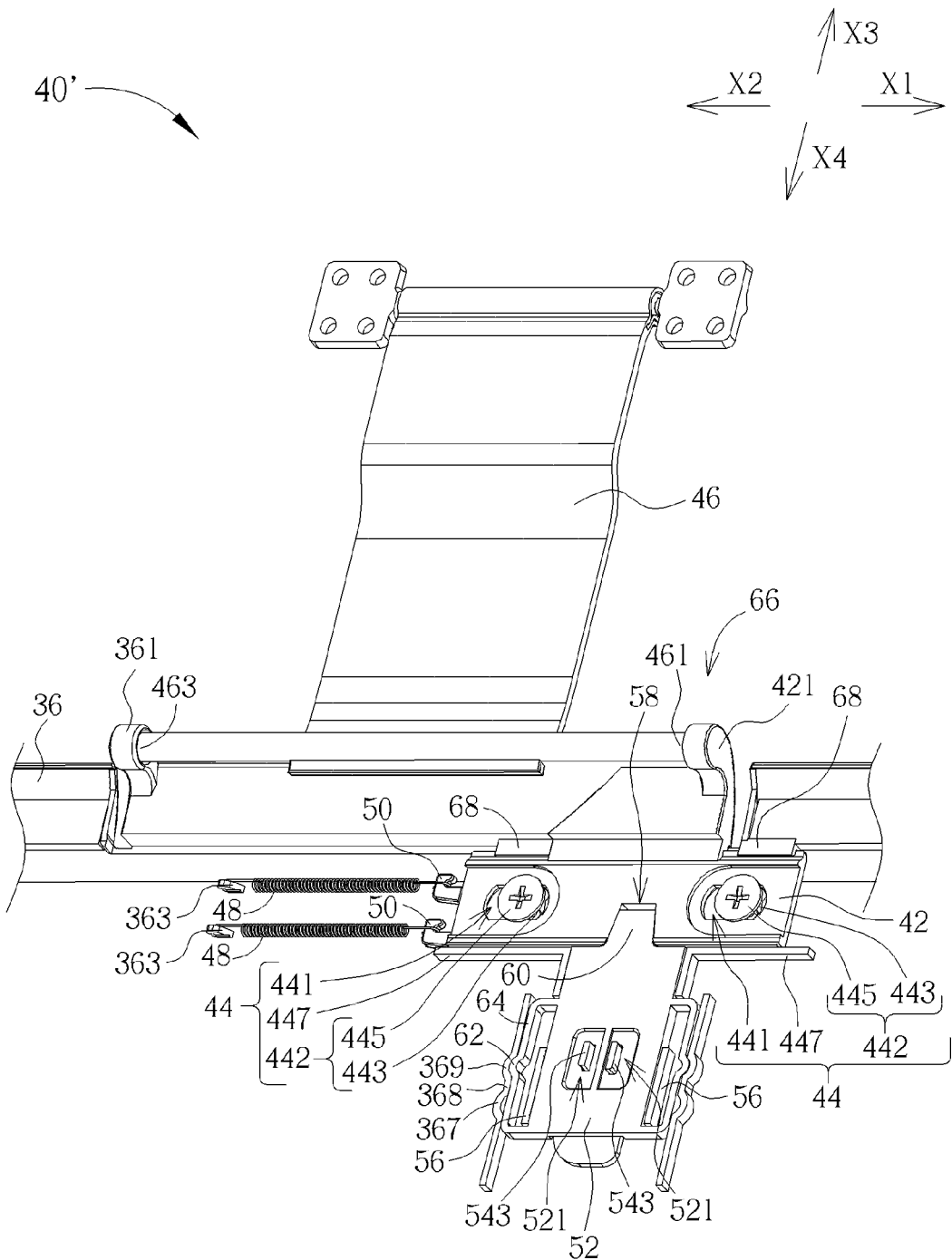
FIG. 13 is a diagram of the hinge mechanism in a wedging status according to a second embodiment of the present invention.

Please refer to FIG. 13. FIG. 13 is a diagram of a hinge mechanism 40' in a wedging status according to a second embodiment of the present invention. As shown in FIG. 13, the main difference between the hinge mechanism 40' and the aforesaid hinge mechanism 40 is that the hinge mechanism 40' omits the first torque module 66. In such a manner, the hinge mechanism 40' can save material cost of the first torque module 66. Whether to dispose the first torque module 66, it depends on practical demands. During assembly, the first pivotal portion 461 of the pivoting member 46 is directly pivoted to the first bearing portion 421 of the sliding member 42, and the pivoting member 46 is capable of pushing the sliding member 42 to the first position. Afterwards, when the sliding member 42 and the pivoting member 46 are slid to the second position, the second pivotal portion 463 of the pivoting member 46 can be pivoted to the second bearing portion 361 of the first casing 36. Components with denoted in FIG. 13 identical to those denoted in FIG. 9 have identical structures and functions, and further description is omitted herein for simplicity.

Figure 14:
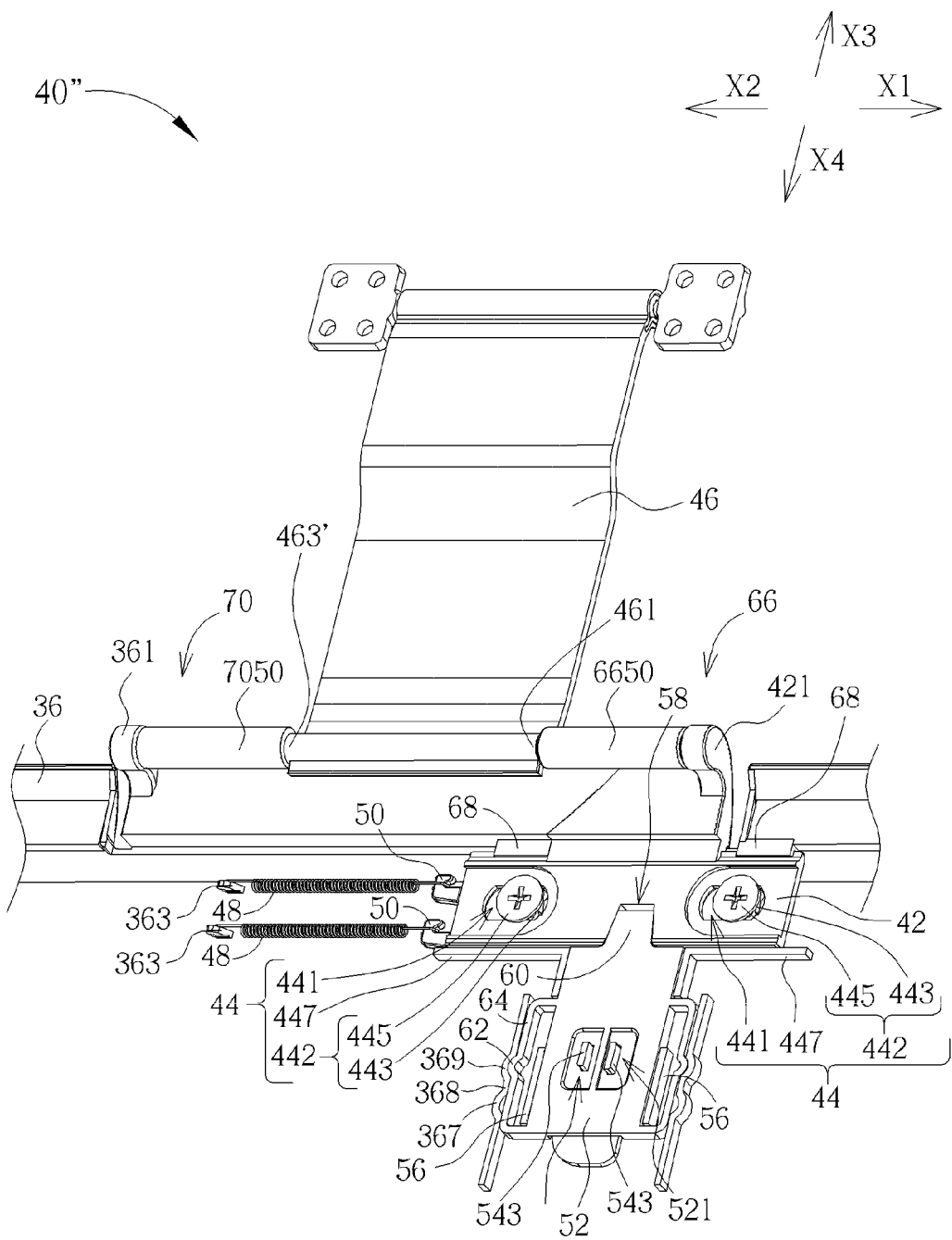
FIG. 14 is a diagram of a hinge mechanism in a wedging status according to a third embodiment of the present invention.

Please refer to FIG. 14. FIG. 14 is a diagram of a hinge mechanism 40" in a wedging status according to a third embodiment of the present invention. As shown in FIG. 14, the main difference between the hinge mechanism 40" and the hinge mechanism 40 is that the hinge mechanism 40' further includes a second torque module 70 connected to a second pivotal portion 463' of the pivoting member 46 and the second bearing portion 361 of the first casing 36. The second torque module 70 is used for providing the pivoting member 46 with a torque cooperatively with the first torque module 66. When the second casing 38 is rotated relative to the first casing 36 to a specific angle, the torque can fix the second casing 38 in the specific angle, so that the user can adjust the second casing 38 according to preference. Furthermore, when the electronic device 30 is in use, the first torque module 66 and the second torque module 70 of the hinge mechanism 40" can avoid the first casing 36 and the second casing 38 from vibration, so that the electronic device 30 is capable of being operated stably.

Figure 15:
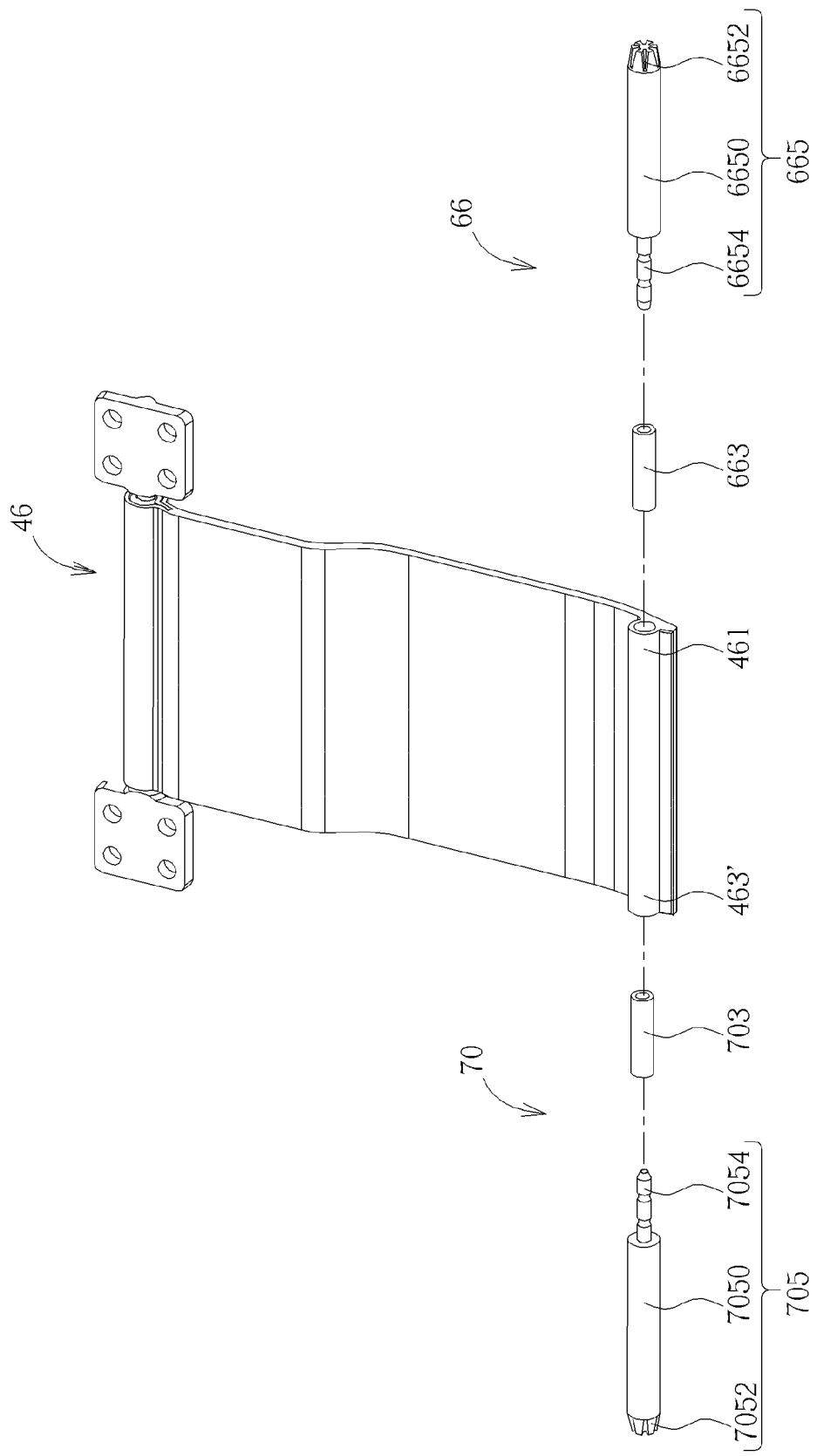
FIG. 15 is an exploded diagram of a pivoting member, a first torque module and a second torque module according to the third embodiment of the present invention.
Figure 16:
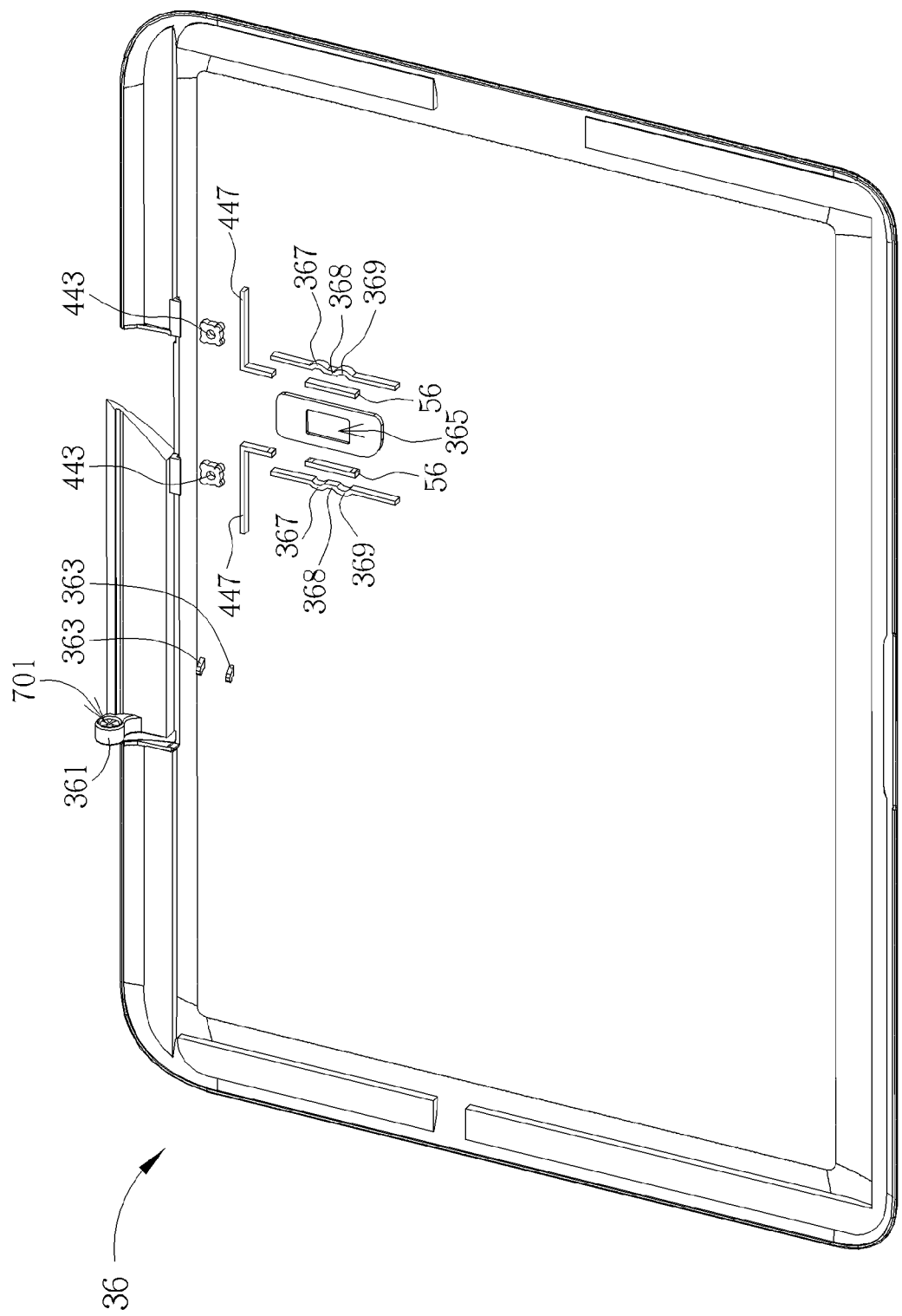
FIG. 16 is a diagram of a first casing in another view according to the third embodiment of the present invention.

Please refer to FIG. 15 and FIG. 16. FIG. 15 is an exploded diagram of the pivoting member 46, the first torque module 66 and the second torque module 70 according to the third embodiment of the present invention. FIG. 16 is a diagram of the first casing 36 in another view according to the third embodiment of the present invention. Furthermore, the second torque module 70 of the hinge mechanism 40" further includes a second engaging member 701 and a second sleeve 703. The second engaging member 701 is fixed inside the second bearing portion 361 of the first casing 36, and the second sleeve 703 is disposed inside the second pivotal portion 463 of the pivoting member 46. In this embodiment, the second engaging member 701 and the second sleeve 703 are made of metal material, and the second engaging member 701 and the second bearing portion 361 of the first casing 36 are, but not limited to, integrally formed in an insert molding manner. For example, the second engaging member 701 can be fixed inside the second bearing portion 361 of the first casing 36 in a hot melting manner as well. In other words, the structures capable of fixing the second engaging member 701 and the second bearing portion 361 of the first casing 36 are within the scope of the present invention.

Furthermore, the first torque module 66 further includes a second shaft 705. In this embodiment, the second shaft 705 is made of metal material. In addition, the second shaft 705 includes a second shaft body 7050, a second engaging end portion 7052 and a second rotable end portion 7054. The second engaging end portion 7052 is connected to an end of the second shaft body 7050, and the second rotable end portion 7054 is connected to the other end of the second shaft body 7050. In addition, the second engaging end portion 7052 is used for engaging the second engaging member 701, so as to fix the second shaft body 7050 of the second shaft 705, and the second rotable end portion 7054 is used for being inserted into the second sleeve 703 in a tight fit manner. The principle of the second torque module 70 is identical to the principle of the first torque module 66, and the further description is omitted herein for simplicity.

Compared to the first embodiment, the first torque module 66 is disposed on a single side. Since the first torque module 66 and the second torque module 70 of the hinge mechanism 40" are symmetrically disposed on the pivoting member 46, the second casing 38 of the second module 34 is capable of being reversely installed on the first casing 36 of the first module 34. In other words, the hinge mechanism 40" can be used for installing the second module 34 on the first module 34 with a monitor oriented upwards, as shown in FIG. 1, so that the user can operate the second module 34 like a notebook computer. The hinge mechanism 40" can be further used for installing the second module 34 on the first module 34 with the monitor oriented downwards which is opposite to that shown in FIG. 1, so that the user can operate the second module 34 like a tablet computer. In such a manner, the symmetry design of the first torque module 66 and the second torque module 70 of the hinge mechanism 40' is capable of being implemented into the electronic device with increasingly flexibility.

Compared to the prior art, the present invention utilizes the first pivotal portion of the pivoting member to slide the sliding member between the first position and the second position. When the first pivotal portion of the pivoting member slides the sliding member to the first position, the second pivotal portion of the pivoting member is capable of separating from the second bearing portion of the first casing, so as to detach the first pivotal portion of the pivoting member from the first bearing portion of the sliding member. In such a manner, the first casing and the second casing of the present invention can be easily detached.

On the other hand, when the first pivotal portion of the pivoting member slides the sliding member to the first position, the second pivotal portion of the pivoting member is capable of being aligned with the second bearing portion of the first casing. Afterwards, the sliding member and the pivoting member are pushed to the second position in the second direction, so that the second pivotal portion of the pivoting member is inserted into the second bearing portion of the first casing. Accordingly, the second casing is capable of being pivoted to the first casing. Finally, the wedging member is slid to the second position for wedging the sliding member in the second position. In such a manner, the second casing can be pivoted to the first casing for easily installing the first casing and the second casing.

In addition, the hinge mechanism of the present invention can further utilize the first torque module to provide the second casing with the torque for holding the second casing at the specific angle. In other words, when the second casing pivots relative to the first casing at the specific angle, the torque provided by the first torque module can fix the second casing at the specific angle, so that the user can adjust the second casing according to preferences. In addition, when the electronic device is in use, the torque provided by the first torque module of the hinge mechanism can prevent the first casing and the second casing from vibration, so as to provide the electronic device with a good feeling of operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hinge mechanism for pivoting a first casing and a second casing, comprising:
   a sliding member disposed on the first casing in a slidable manner, the sliding member comprising a first bearing portion;
   a pivoting member pivoted to the first casing and the second casing, the pivoting member comprising a first pivotal portion and a second pivotal portion, the first pivotal portion being detachably installed in the first bearing portion for driving the first bearing portion to slide the sliding member to a first position in a first direction on the first casing, the second pivotal portion being detachably installed in a second bearing portion of the first casing when the sliding member is slid to a second position in a second direction opposite to the first direction on the first casing; and
   a wedging member disposed on the first casing in a slidable manner for wedging the sliding member when the sliding member is slid to the second position, so as to fix the sliding member in the second position.

2. The hinge mechanism of claim 1, further comprising:
   a sliding constraining structure for constraining the sliding member to slide relative to the first casing in the first direction or in the second direction.

3. The hinge mechanism of claim 2, wherein the sliding constraining structure comprises:
   at least one sliding slot formed on the sliding member, the at least one sliding slot being oriented substantially parallel to the first direction and the second direction; and
   at least one sliding structure disposed on the first casing in a position corresponding to the at least one sliding slot, the at least one sliding structure cooperating with the at least one sliding slot for constraining the sliding member to slide relative to the first casing in the first direction or in the second direction.

4. The hinge mechanism of claim 3, wherein the at least one sliding structure comprises:
   a screw post; and
   a screw component disposed through the corresponding sliding slot to be screwed on the screw post, so that the sliding member slides relative to the first casing by the sliding slot cooperating with the screw component.

5. The hinge mechanism of claim 3, wherein the sliding constraining structure further comprises:
at least one stopping strip abutting against a lateral side of the sliding member, the at least one stopping strip being for constraining the sliding member to slide in the first direction or in the second direction.

6. The hinge mechanism of claim 1, wherein the first casing comprises at least one first connecting portion, and the hinge mechanism further comprises:
at least one second connecting portion disposed on a side of the sliding member; and
at least one resilient member with both ends respectively connected to the at least one first connecting portion and the at least one second connecting portion, the at least one resilient member being for sliding the sliding member to the second position in the second direction.

7. The hinge mechanism of claim 1, further comprising:
at least one constraining member disposed on the first casing and located in a position corresponding to a side of the sliding member, the at least one constraining member being for pressing the sliding member.

8. The hinge mechanism of claim 1, wherein at least one engaging slot is formed on the wedging member, and the hinge mechanism further comprises:
a push button for driving the wedging member to slide relative to the first casing, the push button comprising:
a button body slidably installed on a side of the first casing; and
at least one fixing structure protruding from the button body, the at least one fixing structure being disposed through the first casing to engage with the at least one engaging slot, so that the wedging member is driven by the button body.

9. The hinge mechanism of claim 8, further comprising:
at least one constraining rib disposed on the first casing and located in a position corresponding to a lateral side of the wedging member, the at least one constraining rib being for constraining the wedging member to slide relative to the first casing in a third direction or in a fourth direction opposite to the third direction.

10. The hinge mechanism of claim 9, wherein a first constraining portion and a second constraining portion are formed on the first casing, and the hinge mechanism further comprises:
a protruding structure for selectively engaging with the first constraining portion or the second constraining portion; and
a resilient structure resiliently connected to the wedging member and the protruding structure, the resilient structure driving the protruding structure to selectively engage with the first constraining portion or the second constraining portion when the wedging member slides relative to the first casing to a released position or to an engaging position.

11. The hinge mechanism of claim 10, further comprising:
a first wedging structure disposed on a side of the sliding member; and
a second wedging structure disposed on a side of the wedging member corresponding to the side of the sliding member, the second wedging structure engaging with the first wedging structure when the sliding member slides to the second position and when the wedging member slides to the engaging position in the third direction, so as to fix the sliding member in the second position.

12. The hinge mechanism of claim 1, wherein the first pivotal portion is pivoted to the first bearing portion, and the second pivotal portion is pivoted to the second bearing portion.

13. The hinge mechanism of claim 1, further comprising:
a first torque module connected to the first pivotal portion of the pivoting member and the first bearing portion of the sliding member, the first torque module being for providing the pivoting member with a torque and comprising:
a first engaging member fixed inside the first bearing portion; and
a first shaft, comprising:
a first shaft body;
a first engaging end portion connected to an end of the first shaft body, the first engaging end portion being for engaging with the first engaging member, so as to fix the first shaft body; and
a first rotable end portion connected to the other end of the first shaft body, the first pivotal end portion rotably sheathing the first engaging end portion in a tight fit manner.

14. The hinge mechanism of claim 13, wherein the first torque module further comprises:
a first sleeve disposed inside the first pivotal portion, the first sleeve rotably sheathing the first rotable end portion in a tight fit manner, so that a friction force generates between the first sleeve and the first rotale end portion when the pivoting member rotates relative to the first shaft.

15. The hinge mechanism of claim 13, wherein the first engaging member comprises a plurality of protrusions, the first engaging end portion comprises a plurality of sunken slots corresponding to the plurality of protrusions, and the plurality of sunken slots being respectively for containing the plurality of protrusions, so as to make the first engaging end portion engage with the first engaging member.

16. The hinge mechanism of claim 13, further comprising:
a second torque module connected to the second pivotal portion of the pivoting member and the second bearing portion of the first casing, the second torque module being for providing the pivoting member with a torque and comprising:
a second engaging member fixed inside the second bearing portion; and
a second shaft, comprising:
a second shaft body;
a second engaging end portion connected to an end of the second shaft body, the second engaging end portion being for engaging with the second engaging member, so as to fix the second shaft body; and
a second rotable end portion connected to the other end of the second shaft body, the second pivotal end portion rotably sheathing the second engaging end portion in a tight fit manner.

17. The hinge mechanism of claim 16, wherein the second torque module further comprises:
a second sleeve disposed inside the second pivotal portion, the second sleeve rotably sheathing the second rotable end portion in a tight fit manner, so that a friction force generates between the second sleeve and the second rotale end portion when the pivoting member rotates relative to the second shaft.

18. An electronic device, comprising:
a first module comprising a first casing, the first casing comprising a second bearing portion;
a second module comprising a second casing; and a hinge mechanism for pivoting a first casing and a second casing, the hinge mechanism comprising:
  a sliding member disposed on the first casing in a slidable manner, the sliding member comprising a first bearing portion;
  a pivoting member pivoted to the first casing and the second casing, the pivoting member comprising a first pivotal portion and a second pivotal portion, the first pivotal portion being detachably installed in the first bearing portion for driving the first bearing portion to slide the sliding member to a first position in a first direction on the first casing, the second pivotal portion being detachably installed in a second bearing portion of the first casing when the sliding member is slid to a second position in a second direction opposite to the first direction on the first casing; and
  a wedging member disposed on the first casing in a slidable manner for wedging the sliding member when the sliding member is slid to the second position, so as to fix the sliding member in the second position.

19. The electronic device of claim 18, wherein the hinge mechanism further comprises:
  a first torque module connected to the first pivotal portion of the pivoting member and the first bearing portion of the sliding member, the first torque module being for providing the pivoting member with a torque and comprising:
    a first engaging member fixed inside the first bearing portion; and
    a first shaft, comprising:
      a first shaft body;
      a first engaging end portion connected to an end of the first shaft body, the first engaging end portion being for engaging with the first engaging member, so as to fix the first shaft body; and
      a first rotable end portion connected to the other end of the first shaft body, the first pivotal end portion rotably sheathing the first engaging end portion in a tight fit manner, so that a friction force generates between the first sleeve and the first rotale end portion when the pivoting member rotates relative to the second shaft.

20. The electronic device of claim 18, wherein a first constraining portion and a second constraining portion are formed on the first casing, and the hinge mechanism further comprises:
  a protruding structure for selectively engaging with the first constraining portion or the second constraining portion;
  a resilient structure resiliently connected to the wedging member and the protruding structure, the resilient structure driving the protruding structure to selectively engage with the first constraining portion or the second constraining portion when the wedging member slides relative to the first casing to a released position or to an engaging position;
  a first wedging structure disposed on a side of the sliding member; and
  a second wedging structure disposed on a side of the wedging member corresponding to the side of the sliding member, the second wedging structure engaging with the first wedging structure when the sliding member slides to the second position and when the wedging member slides to the engaging position in the third direction, so as to fix the sliding member in the second position.

* * * * *